United States Patent
Chen et al.

(10) Patent No.: US 10,116,001 B2
(45) Date of Patent: Oct. 30, 2018

(54) LITHIUM, PHOSPHORUS, SULFUR, AND IODINE INCLUDING ELECTROLYTE AND CATHOLYTE COMPOSITIONS, ELECTROLYTE MEMBRANES FOR ELECTROCHEMICAL DEVICES, AND ANNEALING METHODS OF MAKING THESE ELECTROLYTES AND CATHOLYTES

(71) Applicant: QuantumScape Corporation, San Jose, CA (US)

(72) Inventors: Zhebo Chen, San Jose, CA (US); Tim Holme, San Jose, CA (US); William Hudson, San Jose, CA (US); Kian Kerman, San Jose, CA (US); Sunil Mair, San Jose, CA (US); Amal Mehrotra, San Jose, CA (US); Kim Van Berkel, San Jose, CA (US)

(73) Assignee: QUANTUMSCAPE CORPORATION, San Jose, CA (US)

( * ) Notice: Subject to any disclaimer, the term of this patent is extended or adjusted under 35 U.S.C. 154(b) by 0 days.

(21) Appl. No.: 15/367,103

(22) Filed: Dec. 1, 2016

(65) Prior Publication Data

US 2017/0162901 A1 Jun. 8, 2017

Related U.S. Application Data

(60) Provisional application No. 62/263,409, filed on Dec. 4, 2015, provisional application No. 62/321,428, filed on Apr. 12, 2016.

(51) Int. Cl.
 *H01M 10/052* (2010.01)
 *H01M 10/056* (2010.01)
 (Continued)

(52) U.S. Cl.
 CPC .......... *H01M 10/056* (2013.01); *C01D 15/00* (2013.01); *H01M 10/0525* (2013.01);
 (Continued)

(58) Field of Classification Search
 CPC ................. H01M 10/052; H01M 10/0525
 See application file for complete search history.

(56) References Cited

U.S. PATENT DOCUMENTS 6,210,836 B1    4/2001    Takada et al.
6,277,524 B1    8/2001    Kanno
(Continued)

FOREIGN PATENT DOCUMENTS

JP    2001316583       11/2001
JP    2007-273214 A    10/2007
(Continued)

OTHER PUBLICATIONS

Rao et al. (J Solid State Electrochem (2012) 16:1807-1813).*
(Continued)

*Primary Examiner* — Olatunji A Godo
(74) *Attorney, Agent, or Firm* — Squire Patton Boggs (US) LLP

(57) ABSTRACT

The present disclosure sets forth battery components for secondary and/or traction batteries. Described herein are new solid-state lithium (Li) conducting electrolytes including monolithic, single layer, and bi-layer solid-state sulfide-based lithium ion (Li⁺) conducting catholytes or electrolytes. These solid-state ion conductors have particular chemical compositions which are arranged and/or bonded through both crystalline and amorphous bonds. Also provided herein are methods of making these solid-state sulfide-based lithium ion conductors including new annealing methods. These ion conductors are useful, for example, as membrane separators in rechargeable batteries.

56 Claims, 17 Drawing Sheets

(51) Int. Cl.

| | |
|---|---|
| H01M 10/0525 | (2010.01) |
| C01D 15/00 | (2006.01) |
| H01M 10/0562 | (2010.01) |
| H01M 10/0585 | (2010.01) |

(52) U.S. Cl.
CPC ..... *H01M 10/0562* (2013.01); *C01P 2002/72* (2013.01); *C01P 2002/88* (2013.01); *C01P 2004/03* (2013.01); *C01P 2006/40* (2013.01); *H01M 10/0585* (2013.01); *H01M 2300/0068* (2013.01); *H01M 2300/0091* (2013.01); *H01M 2300/0094* (2013.01)

(56) References Cited

U.S. PATENT DOCUMENTS

| | | |
|---|---|---|
| 6,365,300 B1 | 4/2002 | Ota et al. |
| 6,656,641 B1 | 12/2003 | Kumar |
| 7,416,815 B2 | 8/2008 | Ota et al. |
| 7,901,598 B2 | 3/2011 | Ota |
| 8,524,393 B2 | 9/2013 | Kojima |
| 8,546,019 B2 | 10/2013 | Lee et al. |
| 8,697,292 B2 | 4/2014 | Kanno et al. |
| 8,729,866 B2 | 5/2014 | Tamane et al. |
| 8,871,391 B2 | 10/2014 | Liang et al. |
| 8,962,194 B2 | 2/2015 | Senga et al. |
| 9,172,112 B2 | 10/2015 | Hama et al. |
| 2003/0031931 A1 | 2/2003 | Obrovac et al. |
| 2003/0157409 A1 | 8/2003 | Huang |
| 2006/0246355 A1 | 11/2006 | Min et al. |
| 2007/0160911 A1 | 7/2007 | Senga et al. |
| 2007/0172739 A1 | 7/2007 | Visco et al. |
| 2008/0131781 A1 | 6/2008 | Yong et al. |
| 2009/0182066 A1 | 7/2009 | Yang et al. |
| 2009/0226816 A1 | 9/2009 | Yoshida et al. |
| 2010/0019194 A1 | 1/2010 | Fujiwara et al. |
| 2011/0076570 A1 | 3/2011 | Hama et al. |
| 2011/0229765 A1 | 9/2011 | Barker et al. |
| 2011/0259505 A1 | 10/2011 | Lee et al. |
| 2011/0262816 A1 | 10/2011 | Amatucci |
| 2011/0311875 A1 | 12/2011 | Lee et al. |
| 2012/0094185 A1 | 4/2012 | Tsuchida et al. |
| 2012/0196186 A1 | 8/2012 | Richard |
| 2012/0208062 A1 | 8/2012 | Zhou et al. |
| 2012/0276459 A1 | 11/2012 | Im et al. |
| 2013/0004843 A1 | 1/2013 | Suzuki et al. |
| 2013/0040208 A1 | 2/2013 | Kanno et al. |
| 2014/0141341 A1 | 5/2014 | Ohtomo et al. |
| 2014/0170504 A1 | 6/2014 | Baek et al. |
| 2014/0193693 A1 | 7/2014 | Hoshina et al. |
| 2014/0193695 A1 | 7/2014 | Hoshina et al. |
| 2014/0197800 A1 | 7/2014 | Nagase et al. |
| 2014/0363745 A1 | 12/2014 | Hirayama |
| 2015/0017548 A1 | 1/2015 | Kato et al. |
| 2015/0037687 A1 | 2/2015 | Kanno |
| 2015/0056496 A1 | 2/2015 | Liang et al. |
| 2015/0118574 A1 | 4/2015 | Visbal et al. |
| 2016/0156065 A1 | 6/2016 | Visco et al. |
| 2016/0164136 A1 | 6/2016 | Higuchi et al. |
| 2016/0181585 A1 | 6/2016 | Choi et al. |
| 2016/0190638 A1 | 6/2016 | Sugiura et al. |
| 2016/0190640 A1 | 6/2016 | Visco et al. |

FOREIGN PATENT DOCUMENTS

| | | |
|---|---|---|
| JP | 2007273217 | 10/2007 |
| JP | 2009-176541 A | 8/2009 |
| JP | 2011-044249 | 3/2011 |
| JP | 2012-054212 | 3/2012 |
| JP | 2013-12416 A | 1/2013 |
| JP | 2013045683 | 3/2013 |
| JP | 2013-80616 A | 5/2013 |
| JP | 2014241240 | 12/2014 |
| KR | 20140095658 | 8/2014 |
| WO | WO 2011/118801 | 9/2011 |

OTHER PUBLICATIONS

Adams, S. et al., "Structural requirements for fast lithium ion migration in $Li_{10}GeP_2S_{12}$," J. Mater. Chem., 2012, 22, pp. 7687-7691.

Ahn, Byung Tae, et al., "Synthesis and Lithium Conductivities of $Li_2SiS_3$ and $Li_4SiS_4$," Mat. Res. Bull., 1989, vol. 24, pp. 889-897.

Aihara, Yuichi et al., "The electrochemical characteristics and applicability of an amorphous sulfide based solid ion conductor for the next generation solid-state lithium secondary batteries," Front. Energy Res., May 13, 2016, pp. 1-8.

Amaresh, S. et al., "Aluminum based sulfide solid lithium ionic conductors for all solid state batteries," Nanoscale, 2014, 6, pp. 6661-6667.

Andrews, Lester, et al., "Infrared Spectra of $P_4S_{10}$ and its Decomposition Products in Solid Argon," Inorganic Chemistry, 1990, vol. 29, pp. 5222-5225.

Aotani, Noboru, "Synthesis and electrochemical properties of lithium ion conductive glass, $Li_3PO_4$—$Li_2S$—$SiS_2$," Solid State Ionics, 1994, vol. 68, pp. 35-39.

Bhandari, A. et al., "Origin of Fast Ion Conduction in $Li_{10}GeP_2S_{12}$, a Superionic Conductor," J. Phys. Chem. C, 2016, 120, pp. 29002-29010.

Bartholomew, Roger, F., et al., "Electrical properties of new glasses based on the $Li_2S$—$SiS_2$ system," Journal of Non-Crystalline Solids, 1999, vol. 256 & 257, pp. 242-247.

Bron, P. et al., "$Li_{10}Si_{0.3}Sn_{0.7}P_2S_{12}$—A low-cost and low-grain-boundary-resistance lithium superionic conductor," Journal of Power Sources, 329, 2016, pp. 530-535.

Bron, P. et al., "$Li_{10}SnP_2S_{12}$: An Affordable Lithium Superionic Conductor," J. Am. Chem. Soc., 2013, 135, pp. 15694-15697.

Creus, R., et al., "The Use of Ionic and Mixed Conductive Glasses in Microbatteries," Materials Science and Engineering, 1989, B3, pp. 109-112.

Creus, R., et al., "Thin films of ionic and mixed conductive glasses: their use in microdevices," Solid State Ionics, 1992, vol. 53-56, pp. 641-646.

De Klerk, Niek J.J. et al., "Diffusion Mechanism of Li Argyrodite Solid Electrolytes for Li-Ion Batteries and Prediction of Optimized Halogen Doping: The Effect of Li Vacancies, Halogens, and Halogen Disorder," Chem. Mater. 2016, 28, pp. 7955-7963.

Deiseroth, Hans-Jörg, et al., "$Li_6PS_5X$: A Class of Crystalline Li. Rich Solids with an Unusually High Li+ Mobility," Angew. Chem. Int. Ed., 2008, vol. 47, pp. 755-758.

Du, F. et al., "Structures, Thermodynamics, and $Li^+$ Mobility of $Li_{10}GeP_2S_{12}$: A First-Principles Analysis," J. Phys. Chem. C 2014, 118, pp. 10590-10595.

Duluard, Sandrine, et al., "Lithium conducting solid electrolyte $Li_{1.3}Al_{.53}Ti_{1.7}(PO_4)_3$ obtained via solution chemistry," Journal of the European Ceramic Society, 2012, 9 pages.

Eckert, Hellmut, et al., "Structural Transformation of Non-Oxide Chalcogenide Glasses. The Short-Range Order of $Li_2S$-$P_2S_5$ Glasses Studied by Quantitative $^{31}P$ and $^{6,7}Li$ High-Resolution Solid-State NMR," Chem. Mater., 1990, vol. 2, pp. 273-279.

Hassoun, J. et al., "A structural, spectroscopic and electrochemical study of a lithium ion conducting $Li_{10}GeP_2S_{12}$ solid electrolyte," Journal of Power Sources, 229, 2013, pp. 117-122.

Hayashi, Akitoshi, et al., "Characterization of $Li_2S$-$P_2S_5$ glass-ceramics as a solid electrolyte for lithium secondary batteries," Solid State Ionics, 2004, vol. 175, pp. 683-686.

Hayashi, Akitoshi, et al., "Characterization of $Li_2S$—$SiS_2$—$Li_3MO_3$ (M=B, Al, Ga and In) oxysulfide glasses and their application to solid state lithium secondary batteries," Solid State Ionics, 2002, vol. 152-153, pp. 285-290.

Hayashi, Akitoshi, et al., "Development of sulfide glass-ceramic electrolytes for all-solid-state lithium rechargeable batteries," J. Solid State Electrochem, 2010, vol. 14, pp. 1761-1767.

Hayashi, Akitoshi, et al., "Formation of $Li^+$ superionic crystals from the $Li_2S$—$P_2S_5$ melt-quenched glasses," J. Mater Sci, 2008, vol. 43, pp. 1885-1889.

(56) References Cited

OTHER PUBLICATIONS

Hayashi, Akitoshi, et al., "Formation of superionic crystals from mechanically milled $Li_2S$—$P_2S_5$ glasses," Electrochemistry Communications, 2003, vol. 5, pp. 111-114.
Hayashi, Akitoshi, et al., "Improvement of chemical stability of $Li_3PS_4$ glass electrolytes by adding $M_xO_y$ (M=Fe, Zn, and Bi) nanoparticles," Journal of Materials Chemistry A, 2013, vol. 1, pp. 6320-6326.
Hayashi, Akitoshi, et al., "Preparation of $Li_2S$—$P_2S_5$ Amorphous Solid Electrolytes by Mechanical Milling," Journal of the American Ceramic Society, 2001, vol. 84, pp. 477-479.
Hirai, Koichi, et al., "Thermal and electrical properties of rapidly quenched glasses in the systems $LI_2S$—$SiS_2$—$Li_xMO_y$ ($Li_xMO_y$= $Li_4SiO_4$, $Li_2SO_4$)," Solid State Ionics, 1995, vol. 78, pp. 269-273.
Hu, C.H. et al., "Insights into structural stability and Li superionic conductivity of $Li_{10}GeP_2S_{12}$ from first-principles calculations," Chemical Physics Letters, 591, 2014, pp. 16-20.
Hu, Y-W., et al., "Ionic Conductivity of Lithium Orthosilicate-Lithium Phosphate Solid Solutions," J. Electrochem. Soc., 1977, vol. 124, No. 8, pp. 1240-1242.
Inada, T. et al., "All solid-state sheet battery using lithium inorganic solid electrolyte, thio-LISICON," Journal of Power Sources, 194, 2009, pp. 1085-1088.
Inada, T. et al., "Fabrications and properties of composite solid-state electrolytes," Solid State Ionics, 158, 2003, pp. 275-280.
Inada, T. et al., "Silicone as a binder in composite electrolytes," Journal of Power Sources, 119-121, 2003, pp. 948-950.
International Search Report and Written Opinion for International Application No. PCT/US2016/064492 dated Feb. 7, 2017; 13 pages.
International Search Report and Written Opinion for International Application No. PCT/US2014/038283 dated Nov. 17, 2014; 16 pages.
Kaib, Thomas, et al., "New Lithium Chalcogenidotetrelates, LiChT: Synthesis and Characterization of the $Li^=$-Conducting Tetralithium ortho-Sulfidostannate $Li_4SnS_4$," Chemistry of Materials, 2012, vol. 24, pp. 2211-2219.
Kamaya, Noriaki, et al., "A lithium superionic conductor," Nature Materials, 2011, vol. 10, pp. 682-686.
Kamaya, Noriaki, et al., "A lithium superionic conductor," Supporting Information Nature Materials, 2011, vol. 10, pp. 682-686.
Kang, Joonhee et al., "First-Principles Characterization of the Unknown Crystal Structure and Ionic Conductivity of $Li_7P_2S_8I$ as a Solid Electrolyte for High-Voltage Li Ion Batteries," J. Phys. Chem. Lett., 2016, 7, pp. 2671-2675.
Kanno, R. et al., "New Lithium Solid Electrolytes, Thio-Lisicon: Materials Design Concept and Application to Solid State Battery," Solid State Ionics: Trends in the New Millennium, Dec. 7, 2002, pp. 13-22.
Kanno, Ryoji, "Lithium Ionic Conductor Thio-LISICON: The $Li_2S$—$GeS_2$—$P_2S_5$ System," Journal of the Electrochemical Society, 2001, vol. 148, pp. A742-A746.
Kanno, Ryoji, "Synthesis of a new lithium ionic conductor, thio-LISICON-lithium germanium sulfide system," Solid State Ionics, 2000, vol. 130, pp. 97-104.
Kato, Y. et al., "Discharge Performance of All-Solid-State Battery Using a Lithium Superionic Conductor $Li_{10}GeP_2S_{12}$," Electrochemistry, vol. 80, 2012, No. 10, pp. 749-751.
Kato, Y. et al., "Synthesis, structure and lithium ionic conductivity of solid solutions of $Li_{10}(Ge_{1-x}M_x)P_2S_{12}$ (M=Si, Sn)," Journal of Power Sources, 271, 2014, pp. 60-64.
Kennedy, John, H., et al., "A Highly Conductive $Li^=$-Glass System: (1-x)(0.4$SiS_2$-0.6$Li_2S$)-x$LiI$," J. Electrochem. Soc., 1986, pp. 2437-2438.
Kobayashi, Takeshi, et al., "Interfacial reactions at electrode/electrolyte boundary in all solid-state lithium battery using inorganic solid electrolyte, thio-LISICON," Electrochimica Acta, 2008, vol. 53, pp. 5045-5050.
Kondo, S., et al., "New lithium ion conductors based on $Li_2S$—$SiS_2$ system," Solid State Ionics, 1992, vol. 53-56, pp. 1183-1186.
Kuhn, A. et al., "A new ultrafast superionic Li-conductor: ion dynamics in $Li_{11}Si_2PS_{12}$ and comparison with other tetragonal LGPS-type electrolytes," Phys. Chem. Chem. Phys., 2014, 16, pp. 14669-14674.
Kuhn, A. et al., "Single-crystal X-ray structure analysis of the superionic conductor $Li_{10}GeP_2S_{12}$," Phys.Chem. Chem. Phys., 2013, 15, 11620-11622.
Kuhn, A. et al., "Tetragonal $Li_{10}GeP_2S_{12}$ and $Li_7GePS_8$—exploring the Li ion dynamics in LGPS Li electrolytes," Energy Environ. Sci., 2013, 6, pp. 3548-3552.
Kuhn, A. et al., "Ultrafast Li Electrolytes Based on Abundant Elements: $Li_{10}SnP_2S_{12}$ and $Li_{11}Si_2PS_{12}$," Feb. 19, 2014: arXiv: 1402.4586.
Kuhn, A. et al., "Ultrafast Li Electrolytes Based on Abundant Elements: $Li_{10}SnP_2S_{12}$ and $Li_{11}Si_2PS_{12}$," Supporting Information, Feb. 19, 2014: arXiv: 1402.4586.
Leal-Gonzalez, J., et al., "Structure of Lithium Sulfide, $LiGaS_2$," Acta. Cryst., 1990, pp. 2017-2019.
Liu, Zengcai, et al., "Anomalous High Iconic Conductivity of Nanoporous β-$Li_3PS_4$," Journal of the American Chemical Society, 2012, 4 pages.
Liu, Zhangiang, et al., "High performance $Li_2S$—$P_2S_5$ solid electrolyte induced by selenide," Journal of Power Sources, 2014, vol. 260, pp. 264-267.
Menetrier, M, et al., "Iconic conduction in $B_2S^3$—$Li^2S$-Lil glasses," Solid State Ionics, 1992, vol. 53-56, pp. 1208-1213.
Menetrier, M. et al., "Electrochemical Properties of $B_2S_3$—$Li_2S$-Lil Vitreous Electrolytes," J. Electrochem. Soc,. 1984, 131(9), pp. 1971-1973.
Mercier, Rene, et al., "Superionic Conduction in $Li_2S$—$P_2S_5$-Lil-Glasses," Solid State Ionics, 1981, vol. 5, pp. 663-666.
Minami, Keiichi, et al., "Electrical and electrochemical properties of the 70$Li_2S$•(30-x)$P_2S_5$-$_xP_2O_5$ glass-ceramic electrolytes," Solid State Ionics, 2008, vol. 179, pp. 1282-1285.
Minami, Keiichi, et al., "Electrical and electrochemical properties of glass-ceramic electrolytes in the systems $Li_2S$—$P_2S_5$—$P_2S_3$ and $Li_2S$—$P_2S_5$—$P_2O_5$," Solid State Ionics, 2011, vol. 192, pp. 122-125.
Minami, Keiichi, et al., "Lithium ion conductivity of the $Li_2S$—$P_2S_5$ glass-based electrolytes prepared by the melt quenching method," Solid State Ionics, 2007, vol. 178, pp. 837-841.
Minami, Tsutomu, et al., "Preparation and characterization of lithium ion-conducting oxysulfide glasses," Solid State Ionics, 2000, vol. 136-137, pp. 1015-1023.
Minami, Tsutomu, et al., "Recent progress of glass and glass-ceramics as solid electrolytes for lithium secondary batteries," Solid State Ionics, 2006, vol. 177, pp. 2715-2720.
Minami Tsutomu,, "Fast Ion Conducting Glasses," Journal of Non-Crystalline Solids, 1985, vol. 73, pp. 273-284.
Mizuno, Fuminori, et al., "All Solid-State Lithium Secondary Batteries Using High Lithium Ion Conducting $Li_2S$—$P_2S_5$ Glass-Ceramics," Chemistry Letters, 2002, pp. 1244-1245.
Mizuno, Fuminori, et al., "High lithium ion conducting glass-ceramics in the system $Li_2S$—$P_2S_5$," Solid State Ionics, 2006, vol. 177, pp. 2721-2725.
Mizuno, Fuminori, et al., "New, Highly Ion-Conductive Crystals Precipitated from $Li_2S$—$P_2S_5$ Glasses," Advanced Materials, 2005, vol. 17, No. 7, pp. 918-921.
Mo, Y. et al., "First Principles Study of the $Li_{10}GeP_2S_{12}$ Lithium Super Ionic Conductor Material," Chem. Mater., 2012, 24, pp. 15-17.
Morimoto, Hideyuki, et al., "Mechanochemical Synthesis of New Amorphous Materials of 60$Li_2S$•40$SiS_2$ with High Lithium Ion Conductivity," J. Am. Ceram. Soc., 1999, vol. 82, pp. 1352-1354.
Muramatsu, Hiromasa, et al., "Structural change of $Li_2S$—$P_2S_5$ sulfide solid electrolytes in the atmosphere," Solid State Ionics, 2011, vol. 182, pp. 116-119.
Murayama, Masahiro, et al., "Material Design of New Lithium Ionic Conductor thio-LISICON, in the $Li_2S$—$P_2S_5$ System," Solid State Ionics, 2004, vol. 170, pp. 173-180.
Murayama, Masahiro, et al., "Synthesis of New Lithium Ionic Conductor Thio-LISICON-Lithium Silicon Sulfides System," Journal of Solid State Chemistry, 2002, vol. 168, pp. 140-148.

(56) References Cited

OTHER PUBLICATIONS

Norrel, Johannes, et al., "Anion exchange of Oxygen by Sulfur in $GeO_2$-based glasses," Proceedings of SPIE vol. 4990, 2003, 10 pages. pp. 87-96.
Oh, G. G et al., "Bulk-Type All Solid-State Batteries with 5 V Class $LiNi_{0.5}Mn_{1.5}O_4$ Cathode and $Li_{10}GeP_2S_{12}$ Solid Electrolyte," Chem. Mater., 2016, 28, pp. 2634-2640.
Ohtomo, Takamasa, et al., "Characteristics of the $Li_2O$—$Li_2S$—$P_2S_5$ glasses synthesized by the two-step mechanical milling," Journal of Non-Crystalline Solids, 2013, vol. 364, pp. 57-61.
Ohtomo, Takamasa, et al., "Electrical and electrochemical properties of $Li_2S$—$P_2S_5$—$P_2O_5$ glass-ceramic electrolytes," Journal of Power Sources, 2005, vol. 146, pp. 715-718.
Ohtomo, Takamasa, et al., "Suppression of $H_2S$ gas from $Li_2S$—$P_2S_5$ glass electrolytes by the addition of $Li_2O$," The Electrochemical Society, 2012, 1 page.
Ong, S. et al., "Phase stability, electrochemical stability and ionic conductivity of the $Li_{10\pm1}MP_2X_{12}$ (M=Ge, Si, Sn, Al or P, and X=O, S or Se) family of superionic conductors," Energy Environ. Sci., 2013, 6, pp. 148-156.
Ooura, Yuji, et al., "A new lithium-ion conducting glass ceramic in the composition of $75Li_2S \cdot 5P_2S_3 \cdot 20P_2S_5$ (mol%)," Solid State Ionics, 2013, 5 pages.
Patil, Deepak S. et al., "Ionic conductivity study of $LiI$—$Ga_2S_3$—$GeS_2$ chalcogenide glasses using a random-walk Approach," Pure Appl. Chem., 2014, pp. 1-11.
Pradel, A., et al., "Lithium Chalcogenide Conductive Glasses," Materials Chemistry and Physics, 1989, vol. 23, pp. 121-142.
Pradel, Annie, et al., "Ionically Conductive Chalcogenide Glasses," Journal of Solid State Chemistry, 1992, vol. 96, pp. 247-257.
Rangasamy, Ezhiylmurugan et al., "An Iodide-Based $Li_7P_2S_8I$ Superionic Conductor," J. Am. Chem. Soc., 2015, 137, pp. 1384-1387.
Rangasamy, Ezhiylmurugan et al., "Heteroclite electrochemical stability of an I based $Li_7P_2S_8I$ superionic conductor," Angewandte Chemie: https://www.osti.gov/pages/servlets/purl/1185568.
Rao, R. Prasada, et al., "Synthesis and $Li^+$ ion Migration Studies of $Li_6PS_5X$ (X=Cl, Br, I)," Mater. Res. Soc. Symp. Proc., 2011, vol. 1331, 6 pages.
Sahu, Gayatri, et al., "Air-Stable, High-Conduction Solid Electrolytes of Arsenic-Substituted $Li_4SnS_4$," Energy Environ. Sci., 2013, 9 pages.
Sakuda, Atsushi, et al., "All-solid-state lithium secondary batteries using $LiCoO_2$ particles with pulsed laser deposition coatings of $Li_2S$—$P_2S_5$ solid electrolytes," Journal of Power Sources, 2011, vol. 196, pp. 6735-6741.
Sakuda, Atsushi, et al., "Sulfide Solid Electrolyte with Favorable Mechanical Property for All-Solid-State Lithium Battery," Scientific Reports, 2013, 5 pages.
Seino, Yoshikatsu, et al., "A sulphide lithium super ion conductor is superior to liquid ion conductors for use in rechargeable batteries," Energy & Environmental Science, 2013, 5 pages.
Seino, Yoshikatsu, et al., "Synthesis and electrochemical properties of $Li_2S$—$B_2S_3$—$Li_4SiO_4$," Solid State Ionics, 2006, vol. 177, pp. 2601-2603.
Seino, Yoshikatsu, et al., "Synthesis of phosphorous sulfide solid electrolyte and all-solid-state lithium batteries with graphite electrode," Solid State Ionics, 2005, pp. 2389-2393.
Seino, Yoshikatsu, et al., Electronic Supplementary Material (ESI) to "A sulphide lithium super ion conductor is superior to liquid ion conductors for use in rechargeable batteries," Energy & Environmental Science, 2013, 4 pages.
Seo, Inseok, et al., "Fast lithium ion conducting solid state thin-film electrolytes based on lithium thio-germanate materials," Acta Materialia, 2011, vol. 59, pp. 1839-1846.
Seo, Inseok, et al., "Structural Properties of Lithium Thio-Germanate Thin Film Electrolytes Grown by Radio Frequency Sputtering," Inorganic Chemistry, 2011, vol. 50, pp. 2143-2150.

Sistla, Ramesh, K. et al., "Structural studies on $xLi_2S$-$(1-x)P_2S_5$ glasses by X-ray diffraction and molecular dynamics simulation," Journal of Non-Crystalline Solids, 2004, vol. 349, pp. 54-59.
Sun, Y. et al., "Oxygen substitution effects in $Li_{10}GeP_2S_{12}$ solid electrolyte," Journal of Power Sources, 324, 2016, pp. 798-803.
Suzuki, K. et al., "Synthesis, structure, and electrochemical properties of crystalline Li—P—S—O solid electrolytes: Novel lithium-conducting oxysulfides of $Li_{10}GeP_2S_{12}$ family," Solid State Ionics, vol. 288, May 2016, pp. 229-234.
Sveinbjornsson, Dadi, et al., "Ionic Conductivity and the Formation of Cubic $CaH_2$ in the $LiBH_4$—$Ca(BH_4)_2$ Composit," Journal of Solid State Chemistry, 2013, 26 pages.
Tachez, Michel, et al., "Ionic Conductivity of and Phase Transition in Lithium Thiophosphate $Li_3PS_4$," Solid State Ionics, 1984, vol. 14, pp. 181-185.
Takada, K. et al., "Compatibility of Lithium Ion Conductive Sulfide Glass with Carbon-Lithium Electrode," J. Electrochem. Soc. 2003, vol. 150, Issue 3, pp. A274-A277.
Takada, Kazunori, et al., "Electrochemical behaviors of $Li^+$ ion conductor $Li_3PO_4$—$Li_2S$—$SiS_2$," Journal of Power Sources, 1993, vol. 43-44, pp. 135-141.
Takada, Kazunori, et al., "Lithium ion conductive oxysulfide $Li_3PO_4$—$Li_3PS_4$," Solid State Ionics, 2005, vol. 176, pp. 2355-2359.
Takada, Kazunori, et al., "Solid State Lithium Battery with Oxysulfide glass," Solid State Ionics, 1996, vol. 86-88, pp. 877-882.
Takahara, Hikari, et al., Application of Lithium Metal Electrodes to All-Solid-State Lithium Secondary Batteries Using $Li_3PO_4$—$Li_2S$—$SiS_2$ glass, Journal of the Electrochemical Society, 2004, vol. 151, Issue 9, pp. A1309-A1313.
Tarhouchi, I. et al., "Electrochemical characterization of $Li_{10}SnP_2S_{12}$: An electrolyte or a negative electrode for solid state Li-ion batteries?" Solid State Ionics, 296, 2016, pp. 18-25.
Tatsumisago, Masahiro, et al., "All-solid-state lithium secondary batteries using sulfide-based glass-ceramic electrolytes," Journal of Power Sources, 2006, vol. 159, pp. 193-199.
Teragawa, Shingo, et al., "Preparation of $Li_2S$—$P_2S_5$ solid electrolyte from N-methylformamide solution and application for all-solid-state lithium battery," Journal of Power Sources, 2014, vol. 248, pp. 939-942.
Trevey, James, et al., "Glass-ceramic $Li_2S$—$P_2S_5$ electrolytes prepared by a single step ball billing process and their application for all-solid-state lithium-ion batteries," Electrochemistry Communications, 2009, vol. 11, pp. 1830-1833.
Ujiie, Satoshi et al., "Conductivity of $70Li_2S \cdot 30P_2S_5$ glasses and glass-ceramics added with lithium halides," Solid State Ionics, 263, 2014, pp. 57-61.
Ujiie, Satoshi, et al., "Preparation and electrochemical characterization of $(100-x)(0.7Li_2S \cdot 0.3P_2S_5)$ xLiBr glass-ceramic electrolytes," Mater Renew Sustain Energy, 2013, 8 pages.
Wada, H. et al., "Preparation and Ionic Conductivity of New $B_2S_3$—$Li_2S$-LiI Glasses," Mat. Res. Bull., vol. 18, 1983, pp. 189-193.
Wang, Y. et al., "Highly lithium-ion conductive thio-LISICON thin film processed by low-temperature solution method," Journal of Power Sources, 224, 2013, pp. 225-229.
Wang, Y. et al., "Highly lithium-ion conductive thio-LISICON thin film processed by low-temperature solution method," Supporting Information, Journal of Power Sources, 224, 2013, pp. 225-229.
Wang, Yiqun et al., "X-ray photoelectron spectroscopy for sulfide glass electrolytes in the systems $Li_2S$—$P_2S_5$ and $Li_2S$—$P_2S_5$—LiBr," Journal of the Ceramic Society of Japan, 2016, vol. 124, No. 5, pp. 597-601.
Weber, Dominik A. et al., "Structural Insights and 3D Diffusion Pathways within the Lithium Superionic Conductor $Li_{10}GeP_2S_{12}$," Chem. Mater., 2016, 28, pp. 5905-5915.
Wenzel, S. et al., "Direct Observation of the Interfacial Instability of the Fast Ionic Conductor $Li_{10}GeP_2S_{12}$ at the Lithium Metal Anode," Chem. Mater., 2016, 28, pp. 2400-2407.
Xu, M. et al., "One-dimensional stringlike cooperative migration of lithium ions in an ultrafast ionic conductor," Appl. Phys. Lett. 101, 2012, 031901.

(56) References Cited

OTHER PUBLICATIONS

Yamashita, M., et al., "Formation and ionic conductivity of $Li_2S$—$GeS_2$—$Ga_2S_3$ glasses and thin films," Solid State Ionics, 2003, vol. 158, pp. 151-156.

Yamauchi, A., et al., "Preparation and ionic conductivities of $(100-x)(0.75Li_2S0.25P_2S_5)\cdot xLiBH_4$ glass electrolytes," Journal of Power Sources.

Yubuchi, So et al., "Preparation of high lithium-ion conducting $Li_6PS_5Cl$ solid electrolyte from ethanol solution for all-solid-state lithium batteries," Journal of Power Sources, 293, 2015, pp. 941-945.

Zhu, Zhuoying et al., "$Li_3Y(PS_4)_2$ and $Li_5PS_4Cl_2$: New Lithium Superionic Conductors Predicted from Silver Thiophosphates using . Efficiently Tiered Ab Initio Molecular Dynamics Simulations," Chem. Mater., 2017, 29 (6), pp. 2474-2484.

Duluard, Sandrine, et al., "Lithium conducting solid electrolyte $Li_{13}Al_{53}Ti_{17}(PO_4)_3$ obtained via solution chemistry," Journal of the European Ceramic Society, 2012, ttp://dx.doi.org/10.1016/j.jeurceramsoc.2012.08.005, 9 pages.

Duluard, Sandrine, et al., "Lithium conducting solid electrolyte $Li_{13}Al_{53}Ti_{17}(PO_4)_3$ obtained via solution chemistry," Journal of the European Ceramic Society, 2013, vol. 33, pp. 1145-1153.

McGrogan, Frank P. et al., "Compliant Yet Brittle Mechanical Behavior of $Li_2S$—$P_2S_5$ Lithium-Ion-Conducting Solid Electrolyte", (2017), Adv. Energy Mater. 1602011, 5 pages; DOI: 10.1002/aenm.201602011.

Ohtomo, Takamasa, et al., "Suppression of $H_2S$ gas from $Li_2S$—$P_2S_5$ glass electrolytes by the addition of $Li_2O$," The Electrochemical Society, Abstract #1189, Honolulu PRIME 2012, 1 page.

Ooura, Yuji, et al., "A new lithium-ion conducting glass ceramic in the composition of $75Li_2S\cdot 5P_2S_3\cdot 20P_2S_5$ (mol%)," Solid State Ionics, https://doi.org/10.1016/j.ssi.2013.08.023, 5 pages.

Ooura, Yuji et al., 'A new lithium-ion conducting glass ceramic in the composition of $75Li_2S\cdot 5P_2S_3\cdot 20P_2S_5$ (mol%), Solid State Ionics, 2014, vol. 262, pp. 733-737.

Qu, Meng et al., "Nanomechanical Quantification of Elastic, Plastic, and Fracture Properties of $LiC_oO_2$", (2012), Adv. Energy Mater. 2:940-944; 5 pages.

Sahu, Gayatri, et al., "Air-Stable, High-Conduction Solid Electrolytes of Arsenic-Substituted $Li_4SnS_4$," Energy & Environmental Science, 2014, vol. 7, pp. 1053-1058.

Sakuda et al., "Evaluation of elastic modulus of $Li_2S$—$P_2S_5$ glassy solid electrolyte by ultrasonic sound velocity measurement and compression test", (2013), Journal of the Ceramic Society of Japan 121[11]:946-949, 4 pages.

Sakuda, Atsushi, et al., "Sulfide Solid Electrolyte with Favorable Mechanical Property for All-Solid-State Lithium Battery," Scientific Reports, 2013, 3:2261, DOI: 10.1038/srep02261, 5 pages.

Seino et al., Electronic Supplementary Material (ESI) for Energy & Environmental Science, This journal is © The Royal Society of Chemistry, 2014 (4 pages) to "A sulphide lithium super ion conductor is superior to liquid ion conductors for use in rechargeable batteries," Energy & Environmental Science, 2013 (5 pages).

Seino, Yoshikatsu, et al., "A sulphide lithium super ion conductor is superior to liquid ion conductors for use in rechargeable batteries," Energy & Environmental Science, 2013, DOI: 10.1039/c3ee41655k, 5 pages.

Seino, Yoshikatsu, et al., "A sulphide lithium super ion conductor is superior to liquid ion conductors for use in rechargeable batteries," Energy & Environmental Science, 2014, vol. 7, pp. 627-631.

Sveinbjornsson, Dadi, et al., "Ionic Conductivity and the Formation of Cubic $CaH_2$ in the $LiBH_4$—$Ca(BH_4)_2$ Composit," Journal of Solid State Chemistry, DOI: http://dx.doi.org/10.1016/jjssc.2013.12.006, 26 pages.

Sveinbjornsson, Dadi, et al., "Ionic Conductivity and the Formation of Cubic $CaH_2$ in the $LiBH_4$—$Ca(BH_4)_2$ Composit," Journal of Solid State Chemistry, 2014, vol. 211, pp. 81-89.

Ujiie, Satoshi, et al., "Preparation and electrochemical characterization of $(100-x)(0.7Li_2S\cdot 0.3P_2S_5)$ xLiBr glass-ceramic electrolytes," Mater Renew Sustain Energy, 2013, 2:18, pp. 1 of 8; DOI 10.1007/s40243-013-0018-x.

Ujiie, Satoshi, et al., "Preparation and electrochemical characterization of $(100-x)(0.7Li_2S\cdot 0.3P_2S_5)$ xLiBr glass-ceramic electrolytes," Mater Renew Sustain Energy, 2014, 3:18, pp. 1 of 8; DOI 10.1007/s40243-013-0018-x.

Yamauchi et al., "Preparation and ionic conductivities of $(100-x)(0.75Li_2S\cdot 0.25P_2S_5)\cdot xLiBH_4$ glass electrolytes," Journal of Power Sources, 2013, doi: 10.1016/j.jpowsour.2012.12.001, 22 pages.

Yamauchi et al., "Preparation and ionic conductivities of $(100-x)(0.75Li_2S\cdot 0.25P_2S_5)\cdot xLiBH_4$ glass electrolytes," Journal of Power Sources, 2013, vol. 244, pp. 707-710.

\* cited by examiner

LITHIUM, PHOSPHORUS, SULFUR, AND IODINE INCLUDING ELECTROLYTE AND CATHOLYTE COMPOSITIONS, ELECTROLYTE MEMBRANES FOR ELECTROCHEMICAL DEVICES, AND ANNEALING METHODS OF MAKING THESE ELECTROLYTES AND CATHOLYTES

This application claims priority to U.S. Provisional Patent Application No. 62/321,428, filed Apr. 12, 2016, and also claims priority to U.S. Provisional Patent Application No. 62/263,409, filed Dec. 4, 2015, the disclosures of which are herein incorporated by reference in their entirety for all purposes.

BACKGROUND

To transition from the current energy economy, based on the consumption of nonrenewable petroleum-based energy sources, into a future energy economy, in which humans sustainably produce, store, and consume renewable energy, a series of technological challenges must be met. With respect to automotive transportation, in particular, first and foremost among these challenges is the unmet need for renewable energy storage devices which are suitable replacements for the internal combustion engine. Rechargeable batteries and lithium (Li) rechargeable batteries, in particular, are useful substitutes in some automotive applications, such as all electric and hybrid-electric vehicles, but the high cost and limited performance of conventional rechargeable batteries remains the main impediment preventing mainstream adoption of electric vehicle technology. Solid state rechargeable batteries have been proposed as next generation batteries for automotive applications in large part due to the increased energy density (volumetric and gravimetric) possible for these batteries when compared to their conventional liquid-electrolyte based. Of these solid state batteries, those which include a lithium metal anode are thought to achieve the highest energy densities due to the maximized difference in voltage for a Li ion situated in any cathode active material relative to Li in Li metal.

In a rechargeable Li ion battery, Li$^+$ ions move from a negative electrode to a positive electrode during discharge of the battery and in the opposite direction during charge. An electrolyte separates and electrically insulates the positive and negative electrodes while also providing a conduit for Li$^+$ ions to conduct between the electrodes. The electrolyte also ensures that the electrons, which are produced at the same time that Li$^+$ ions (e.g., Li$\rightleftharpoons$Li$^+$+e$^-$) are produced during discharge of battery, are conducted by way of a pathway which is external and parallel to the Li$^+$ ion conduction pathway. A critically important component of solid state batteries is therefore the electrolyte, which electrically isolates the positive and negative electrodes, and a catholyte, which is intimately mixed with a positive electrode active material to facilitate the ionic conductivity therein. A third important component, in some Li ion batteries, is an anolyte which is laminated to, or in contact with, an anode material (i.e., negative electrode material; e.g., Li-metal) and which may provide a chemically stable barrier between the anode material on one side of the anolyte and the solid-state electrolyte on the other side of the anolyte. Currently available electrolyte, catholyte, and anolyte materials, however, are not sufficiently stable within, or otherwise suitable for use with, solid state batteries which include Li metal anodes or which operate above 4.2V.

Conventional rechargeable batteries use liquid-based electrolytes which include lithium salts in organic solvents (e.g., 1M LiPF$_6$ in 1:1 ethylene carbonate:diethylene carbonate). However, these electrolytes suffer from several problems including outgassing at high voltage and flammability of the organic solvents during thermal runaway (short circuit, e.g., Li-dendrite). As an alternative to these liquid-based electrolytes, Li batteries with a solid-state sulfide-based electrolyte membrane have been described. For example, certain sulfide-based electrolyte materials have been known as solid-state electrolytes suitable for use in solid-state lithium battery. See, for example, (a) S. Ujiie, et al., Solid State Ionics, 211 (2012) 42-45; (b) S. Ujiie, et al., J Solid State Electrochem., (2013) 17:675-680; (c) Hans-Jorg Deiseroth, et al., Angew. Chem. Int. Ed., 2008, 47, 755-758; (d) Prasada Rao Rayavarapu, et al., J Solid State Electrochem., (2012) 16:1807-1813; (e) Shiao-Tong Kong, Chem. Eur. J. 2010, 16, 2198-2206; (f) Ezhiylmurugan Rangasamy, et al., DOI: 10.1021/ja508723m; (g) Kato, Y. et al., *Nature Energy*, Article number 16030 (2016) doi: 10.1038/nenergy.2016.30. Some publications, such as U.S. Pat. No. 7,390,591 to Visco, et al., set forth layered solid-state sulfide-based electrolytes which include one layer which is a Li-metal-interfacing and lithium-metal-compatible layer (e.g., Li$_3$N, Li$_3$P, LiI, LiBr, LiCl, LiF and LiPON) and which is laminated to a second layer which is a cathode-interfacing and cathode-compatible-layer which may include a sulfide-based electrolyte (e.g., Li$_3$PO$_4$.Li$_2$S.SiS$_2$, Li$_2$S.GeS$_2$.Ga$_2$S$_3$). Such solid-state electrolytes suffer, however, from poor conductivity and chemical instability such that they are not suitable for large scale market adoption in solid-state batteries which include a Li metal anode. As such, there exists a need for improved solid-state sulfide-based electrolytes and catholytes. The instant disclosure sets forth such electrolytes and catholytes, as well as methods for making and using the same.

BRIEF SUMMARY

The present disclosure relates generally to components for lithium rechargeable batteries. Described herein are, for example, new solid-state lithium ion (Li$^+$) conducting electrolytes including single layer and multi-layer sulfide-based Li$^+$ conducting electrolytes as well as catholytes. These solid-state ion electrolytes have particular chemical compositions which are arranged and/or bonded through specific crystalline bonds, amorphous bonds, and combinations thereof. Also provided herein are methods of making these solid-state sulfide-based Li$^+$ electrolytes including certain annealing methods.

In an embodiment, provided herein are solid-state sulfide-based lithium ion conductors suitable for use as catholytes and electrolytes in lithium ion batteries. Also provided herein are methods of making these solid-state sulfide-based lithium ion conductors. In some examples, the particular annealing methods set forth herein influence the bulk chemical composition, the surface chemical composition, the chemical structure (e.g., bond type and arrangement), the crystallinity, the stability and the conductivity as well as other characteristics of these solid-state sulfide-based lithium ion conductors. A solid-state electrolyte membrane (i.e., separator for positive and negative electrodes) set forth herein may include solid-state sulfide-based lithium ion conductors which comprise lithium, phosphorous, and sulfur. In some examples, a halogen atom (e.g., F, Cl, Br, or I) is also present. In some examples, a solid electrolyte membrane set forth herein may include solid-state sulfide-based lithium ion conductors which consist essentially of lithium, phosphorous, sulfur, and iodine. In certain of these examples, the solid electrolyte membrane set forth herein is semi-amorphous and may include solid-state sulfide-based lithium ion conductors which consist essentially of lithium, phosphorous, sulfur, and iodine. Certain solid electrolyte membranes set forth herein include solid-state sulfide-based lithium ion conductors which comprise, or consist essentially of, lithium, phosphorous, sulfur, and iodine. In some examples, these solid-state sulfide-based lithium ion conductors are milled as micron and nanometer sized particles and mixed with positive electrode active materials to form cathode active composite materials having these solid-state sulfide-based lithium ion conductors therein as catholytes.

In a second embodiment, set forth herein is a solid-state electrolyte layer which comprises or consists essentially of lithium, phosphorous, sulfur and iodine. The composition of the solid electrolyte layer may be characterized by, in some examples, an electrolyte comprising a compound characterized by $Li_xP_yS_zI_t$, wherein $5 \leq x \leq 12$; $1 \leq y \leq 3$; $5 \leq z \leq 9$, and $0.1 \leq t \leq 2$ and in which this compound is characterized by an x-ray powder diffraction (XRD) pattern having at least one of the following reflections at: 20, 25, 27, 29, and 45±1° (2Θ). In these compounds, subscripts x, y, z, and t are rational numbers and the compound is neutrally charged. In some examples, this solid-state electrolyte comprises one layer of a multi-layer or bilayer solid-state electrolyte.

In a third embodiment, set forth herein is an electrolyte comprising a compound characterized by $Li_xP_yS_zI_t$, wherein $5 \leq x \leq 8$; $1 \leq y \leq 3$; $5 \leq z \leq 8$, and $0.1 \leq t \leq 2$; and characterized by an x-ray powder diffraction (XRD) pattern not having at least one of the following reflections 21, 28, 33, or 46 (2Θ). In this compound, subscripts x, y, z, and t are rational numbers which are selected such that the compound is neutrally charged. In some examples, this solid-state electrolyte comprises one layer of a multi-layer or bilayer solid-state electrolyte.

In a fourth embodiment, set forth herein are methods of making the electrolyte and catholyte compositions set forth herein. In certain embodiments, the methods include making $Li_xP_yS_zI_t$, wherein $5 \leq x \leq 12$; $1 \leq y \leq 3$; $5 \leq z \leq 9$, and $0.1 \leq t \leq 2$, wherein the $Li_xP_yS_zI_t$ is characterized by an XRD pattern having at least one of the following reflections at: 20, 25, 27, 29, and 45 (2Θ); wherein the method comprises the following steps. In these embodiments, the methods include providing a lithium sulfide compound, providing a phosphorous sulfide compound, providing a lithium iodide compound, and mixing the lithium sulfide compound, phosphorus sulfide compound, and lithium iodide compound to form a mixture. The methods also include milling the mixture to form a milled mixture, and heating the mixture at a temperature within the range from about 100 to about 300° C.

In a fifth embodiment, set forth herein are methods of using the electrolyte and/or catholyte compositions set forth herein in electrochemical devices.

In a sixth embodiment, set forth herein are electrochemical devices which have electrolyte and/or catholytes which are comprised of the electrolyte and/or catholyte compositions set forth herein.

In a seventh embodiment, set forth herein is a multilayer (e.g., bilayer) solid-state electrolyte membrane which includes different types of sulfide-based electrolytes in each layer. In some examples, one layer is characterized by $Li_xP_yS_zI_t$, wherein $5 \leq x \leq 12$; $1 \leq y \leq 3$; $5 \leq z \leq 9$, and $0.1 \leq t \leq 2$, and another layer is characterized by SLOPS, as defined herein and below.

DETAILED DESCRIPTION

Figure 1:
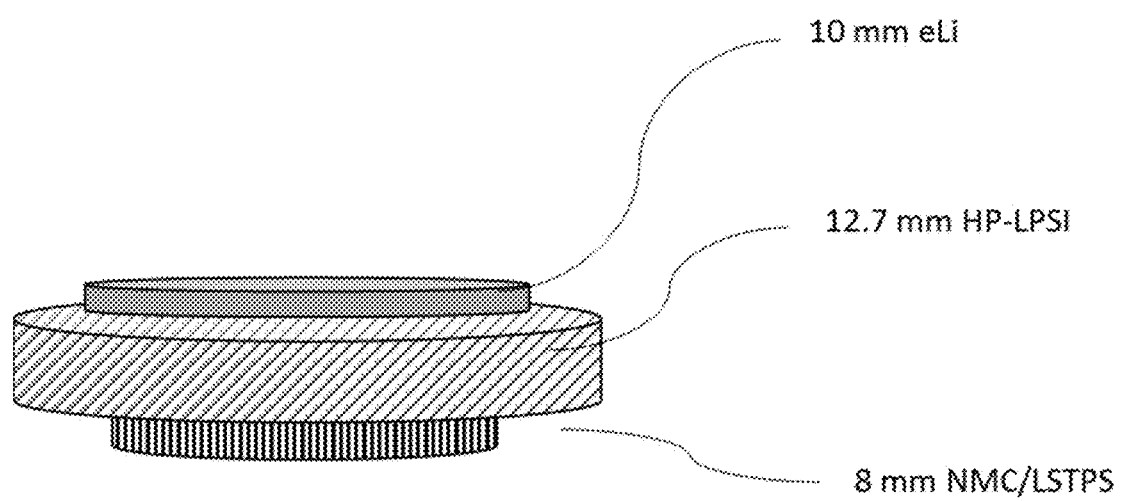
FIG. 1 illustrates an example solid-state electrochemical cell configuration in which the annealed LPSI compositions set forth herein are used as a solid-state electrolyte membrane.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. The following description enables one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Definitions

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the phrase "arsenic species," refers to any compound, composite, ion, or molecular unit which includes or is bonded to at least one Arsenic (As) atom.

As used herein, the term "anolyte" refers to an ionically conductive material that is mixed with, or layered upon, or laminated to the negative electrode. A solid electrolyte layer may have different portions (or sub-layers) with particular compositions and characteristics, such as a portion contacting a positive electrode and another portion contacting a negative electrode. The portion contacting the positive electrode may be referred to as a catholyte or, more specifically, a catholyte layer or a catholyte sub-layer. The electrolyte portion contacting the negative electrode may be referred to as an anolyte or, more specifically, an anolyte layer or an anolyte sub-layer. As used herein, the term anolyte refers to a material which is chemically compatible with Li metal when in direct contact thereto. Chemically compatible means that the material does not react with Li metal in such a way that is detrimental to the anolytes ability to conduct Li ions.

As used herein, "bi-layer electrolyte" refers to a solid electrolyte have at least two layers. In some examples, one of these at least two layers is a layer which is chemically compatible with lithium metal and is referred to herein as the anolyte layer. In some examples, the anolyte layer is a LPSI material (i.e., includes Li, P, S, and I atoms bonded together). In some examples, another one of these at least two layers is a layer which is chemically compatible with a gel electrolyte (e.g., 80:20 to 50:50 vol. % PvDF:HFP to EC:EMC) and is referred to herein as the electrolyte layer (also referred to herein as the catholyte layer). Herein, PvDF is polyvinylidene fluoride; HFP is hexafluoropropylene; EC is ethylene carbonate; and EMC is ethyl methyl carbonate. In some examples, the electrolyte layer is a material containing Si, Li, O, P, and S and is referred to herein as a SLOPS material, which is further defined below. In some examples, the electrolyte layer is a material containing Si, Li, O, P, and S and is referred to herein as a SLOPS/LSS material. As used herein, LSS includes, unless otherwise specified, a 60:40 molar ratio $Li_2S:SiS_2$.

As used herein, "SLOPS" includes, unless otherwise specified, a 60:40 molar ratio of $Li_2S:SiS_2$ with 0.1-10 mol. % $Li_3PO_4$. In some examples, the electrolyte membrane, set forth herein, has one layer of LPSI which interfaces with a gel electrolyte and/or the cathode. In some examples, the electrolyte membrane, set forth herein, has another layer of SLOPS/LSS which interfaces with a lithium metal anode. In some examples, these layers of LPSI and SLOPS/LSS are hot pressed together to form a single membrane having at least two sides, each side being characterized by unique chemical compositions, wherein one side is LPSI and the other side being SLOPS or SLOPS/LSS. In some examples, "SLOPS" includes $Li_{10}Si_4S_{13}$ (50:50 $Li_2S:SiS_2$) with 0.1-10 mol. % $Li_3PO_4$. In some examples, "SLOPS" includes $Li_{26}Si_7S_{27}$ (65:35 $Li_2S:SiS_2$) with 0.1-10 mol. % $Li_3PO_4$. In some examples, "SLOPS" includes $Li_4SiS_4$ (67:33 $Li_2S:SiS_2$) with 0.1-5 mol. % $Li_3PO_4$. In some examples, "SLOPS" includes $Li_{14}Si_3S_{13}$ (70:30 $Li_2S:SiS_2$) with 0.1-5 mol. % $Li_3PO_4$. In some examples, "SLOPS" is characterized by the formula $(1-x)(60:40\ Li_2S:SiS_2)*(x)(Li_3PO_4)$, wherein x is from 0.01 to 0.99. As used herein, "LBS-PDX" refers to an electrolyte composition of $Li_2S:B_2S_3:Li3PO4$:LiX where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used herein, "LTS" refers to an electrolyte composition of $Li_2S:SnS_2:As_2S_5$.

As used herein, "C65," refers to a source of carbon which is commercially available and identified commercially as Timbale carbon super C65.

As used herein, the term, "Ra," is a measure of surface roughness wherein Ra is an arithmetic average of absolute values of sampled surface roughness amplitudes. Surface roughness measurements can be accomplished using, for example, a Keyence VK-X100 instrument that measures surface roughness using a laser.

As used herein, the term, "Rt," is a measure of surface roughness wherein Rt is the maximum peak height of sampled surface roughness amplitudes.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the phrases "electrochemical cell," "battery cell," or "stack," shall mean a single cell including a positive electrode and a negative electrode, and an electrolyte positioned between the positive and negative electrodes. In some embodiments, the same battery cell includes multiple positive electrodes and/or multiple negative electrodes enclosed in one container (e.g., coin cell, prismatic cell housing, pouch).

As used herein, a "binder" refers to a material that assists in the adhesion of another material. For example, in some composites herein, sulfide-based electrolyte particles are adhered to other sulfide-based electrolyte particles by a binder polymer. This adhesion can result from chemical bond formation between the sulfide-based electrolyte particles and the binder polymer and/or from the entanglement, coordination or adsorption of the polymer with the sulfide-based electrolyte particles. Binders useful in the present invention include, but are not limited to, polypropylene (PP), atactic polypropylene (aPP), isotactic polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), stereoblock polypropylenes, polypropylene polymethylpentene copolymer, polyethylene oxide (PEO), PEO block copolymers, silicone, and the like.

As used herein, the terms "cathode" and "anode" refer to the electrodes of a battery. During a charge cycle in a Li-secondary battery, Li ions leave the cathode and move through an electrolyte and to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode.

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer which is laminated to a positive or negative electrode. During charging and discharging, electrons move in the opposite direction to the flow of Li ions and pass through the current collector when entering or exiting an electrode.

As used herein, the phase "glassy," refers to a material that is characterized as a glass. Glasses include amorphous solid materials that exhibit a glass transition, which is the reversible transition in amorphous materials (or in amorphous regions within semicrystalline materials) from a hard and relatively brittle state into a molten or rubber-like state.

As used herein, the term "amorphous," refers to a material that is not crystalline or that does not contain a majority crystalline phase. Amorphous refers to a material that does not evidence a crystalline property, for example, well-defined x-ray diffraction peaks as measured by x-ray diffraction. An amorphous material is at least primarily amorphous and characterized as having more amorphous components than crystalline components. Substantially amorphous refers to a material that does not include well defined x-ray diffraction peaks or that is characterized by an x-ray diffraction pattern that includes broad reflections that are recognized by a person having ordinary skill in the art as having the majority constituent component phase as an amorphous phase. A material that is substantially amorphous may have nanosized domains of crystallinity but which are still characterized by an x-ray diffraction pattern to be primarily in an amorphous phase. In a substantially amorphous material, transmission electron microscopy (TEM) selected area diffraction pattern (SADP) may evidence regions of crystallinity but would also evidence a majority of the volume of the material as amorphous.

As used herein, the term "semiamorphous," refers to a composition comprising both crystalline and amorphous domains. A semiamorphous material includes both nanocrystalline and/or microcrystalline components in addition to amorphous components. A semiamorphous material is a material that is partially crystallized or is a material which includes some crystalline bulk and some amorphous bulk. For example a material heated to its crystallization temperature, but subsequently cooled before the entirety of the material is able to crystallize, completely, is referred to herein as a semiamorphous material. Examples of semiamorphous materials described herein, include but are not limited to, $Li_{7.4}P_{1.8}S_{7.2}I$ when annealed at 190° C. for a time less than the time required to crystallize all or the majority of $Li_{7.4}P_{1.8}S_{7.2}I$; or also $Li_{7.4}P_{1.8}S_{7.2}I$ when annealed at temperatures greater than 200° C. but for short time periods which do not allow all or the majority of $Li_{7.4}P_{1.8}S_{7.2}I$ to completely crystallize. As used herein, a semiamorphous material can be characterized by an XRD powder pattern in which the primary peak of highest intensity has a full width at half maximum of at least 1° (2Θ), or at least 2° (2Θ), or at least 3° (2Θ).

As used herein, the phrase "nanocrystalline" refers to a material wherein the constituent crystalline components are separated by nanodimensions. For example, a nanocrystalline LiI includes LiI in which the domains of crystalline LiI have median physical dimensions of approximately 1-100 nm, or 2-50 nm, or 1-10 nm, or 2-5 nm, or 5-15 nm, or 5-20 nm, or the like as measured in a transmission electron microscopy (TEM) micrograph by identification of regions of visual contrast of different nanodomains. Nanocrystalline as used herein, the term "primarily nanocrystalline" refers to a material that includes nanodimensioned crystalline domains as the majority phase or majority component, which contributes to the crystalline character of the material.

As used herein, the term "crystalline domain" refers to a part, portion, or component of a material having crystalline character and that is physically ordered as a crystal. The domain represents the boundaries of the crystalline component. As used herein, a crystalline solid is a material whose constituent atoms, molecules, or ions are arranged in an ordered pattern extending in three spatial dimensions. The boundaries of the constituent ordered portion of the material are referred to as the crystalline domain. For a material that has both crystalline and non-crystalline components, the crystalline components are referred to as the crystalline domains. The size of the domains represents the dimensions of the boundaries encompassing a given crystalline component. For example, some of the materials set forth herein have both amorphous and crystalline components, wherein the crystalline components are ordered for 1-20 nm. Such materials are referred to as nanodomained crystals.

As used herein, the phrase "nanodimensioned" refers to a material wherein the constituent components are separated by nanodimensions. For example, a nanodimensioned LiI includes LiI in which the domains of crystalline LiI or amorphous LiI have median physical dimensions of approximately 1-100 nm, or 2-50 nm, or 1-10 nm, or 2-5 nm, or 5-15 nm, or 5-20 nm, or the like as measured in a TEM micrograph by identification of regions of visual contrast of different nanodomains.

As used herein, "LPS," refers to an electrolyte having Li, P, and S chemical constituents. As used herein, "LPSO," refers to LPS that is doped with or has O present. In some examples, "LPSO," is a LPS material with an oxygen content between 0.01 and 10 atomic %. LPS refers to an electrolyte material that can be characterized by the formula $Li_xP_yS_z$ where $0.33 \leq x \leq 0.67$, $0.07 \leq y \leq 0.2$ and $0.4 \leq z \leq 0.55$. LPS also refers to an electrolyte characterized by a product formed from a mixture of $Li_2S:P_2S_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S:P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S:P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S:P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S:P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %. In some examples, LPS includes, but is not limited to, $Li_2S:P_2S_5$ from 50:50 to 85:15 molar ratio. In some examples, LPS includes, but is not limited to, $Li_7P_3S_{11}$ or $Li_3PS_4$. In some examples, LPS is characterized by $(100-x)Li_2S*(x)P_2S_5$ where $15 \leq x \leq 50$.

As used herein, "LPSI," refers to LPS which is doped with or which further includes LiI or $I_2$. LPSI includes any compositions characterize by $Li_xP_yS_zI_t$ wherein $5 \leq x \leq 12$; $1 \leq y \leq 3$; $5 \leq z \leq 9$, and $0.1 \leq t \leq 2$. LPSI also refers to any mixture of $Li_2S:P_2S_5$:LiI, pre or post annealing and any annealing products thereof. In some examples, LPSI includes, but is not limited to species such as $Li_7P_2S_8I$, $Li_{7.4}P_{1.6}S_{7.2}I$, $Li_{11}P_2S_6I$, or $Li_6PS_5I$.

As used herein, "LSTPS," refers to a Li ion conducting composition that comprises lithium (Li), silicon (Si), tin (Sn), phosphorus (P), and sulfur (S). Example LSTPS materials include those electrolyte and catholyte compositions set forth in US Patent Application Publication No. 2015-0171465, which published on Jun. 18, 2015, entitled SOLID STATE CATHOLYTE OR ELECTROLYTE FOR BATTERY USING $Li_4MP_BS_C$ (M=Si, Ge, AND/OR Sn), and filed May 15, 2014, or U.S. Pat. No. 9,172,114, which issued Oct. 27, 2015, the entire contents of which are incorporated by reference in their entirety.

As used herein, "NMC," refers to a positive electrode active material which intercalates lithium ions and includes an oxide or oxides of Nickel (Ni), Manganese (Mn), and Cobalt (Co). Examples of NMC include, but are not limited to, those positive electrode active materials set forth in U.S. Pat. No. 6,680,143; 6,677,082; 8,685,565; 8,241,791; 7,078,128; or 6,964,828, or in US Patent Application Publication No. US2011/0250508, filed Oct. 13, 2009.

As used herein, the phrase "germanium species," refers to any compound, composite, ion, or molecular unit which includes or is bonded to at least one Germanium (Ge) atom.

As used herein, the term "catholyte," refers to a Li ion conductor that is intimately mixed with, or that surrounds, or that contacts the positive electrode active materials and provides an ionic pathway for Li to and from the active materials. Catholytes suitable with the embodiments described herein include, but are not limited to, catholytes having the common name LPS, LXPS, LXPSO, where X is Si, Ge, Sn, As, Al, LATS, or also Li-stuffed garnets, or combinations thereof, and the like. Catholytes may also be liquid, gel, semi-liquid, semi-solid, polymer, and/or solid polymer ion conductors known in the art. Catholytes include those catholytes set forth in US Patent Application Publication No. 2015-0171465, which published on Jun. 18, 2015, entitled SOLID STATE CATHOLYTE OR ELECTROLYTE FOR BATTERY USING $Li_4MP_BS_C$ (M=Si, Ge, AND/OR Sn), filed May 15, 2014, the contents of which are incorporated by reference in their entirety. Catholytes include those catholytes set forth in US Patent Application Publication No. 2015/0099190, published on Apr. 9, 2015, entitled GARNET MATERIALS FOR LI SECONDARY BATTERIES AND METHODS OF MAKING AND USING GARNET MATERIALS, and filed Oct. 7, 2014, the contents of which are incorporated by reference in their entirety.

In some examples, gel catholytes and gel electrolytes include any suitable ionically conducting gels or liquid-based electrolyte set forth in U.S. Pat. No. 5,296,318, entitled RECHARGEABLE LITHIUM INTERCALATION BATTERY WITH HYBRID POLYMERIC ELECTROLYTE.

As used herein, the term "electrolyte," refers to a material that allows ions, e.g., $Li^+$, to migrate therethrough but which does not allow electrons to conduct therethrough. Electrolytes are useful for electrically isolating the cathode and anodes of a secondary battery while allowing ions, e.g., $Li^+$, to transmit through the electrolyte.

As used herein, the phrase "$d_{50}$ diameter" or "median diameter ($d_{50}$)" refers to the median size, in a distribution of sizes, measured by microscopy techniques or other particle size analysis techniques, such as, but not limited to, scanning electron microscopy or dynamic light scattering. $D_{50}$ describes a characteristic dimension of particles at which 50% of the particles are smaller than the recited size. As used herein "diameter ($d_{90}$)" refers to the size, in a distribution of sizes, measured by microscopy techniques or other particle size analysis techniques, including, but not limited to, scanning electron microscopy or dynamic light scattering. $D_{90}$ includes the characteristic dimension at which 90% of the particles are smaller than the recited size. As used herein "diameter ($d_{10}$)" refers to the size, in a distribution of sizes, measured by microscopy techniques or other particle size analysis techniques, including, but not limited to, scanning electron microscopy or dynamic light scattering. $D_{10}$ includes the characteristic dimension at which 10% of the particles are smaller than the recited size.

As used herein, the term "rational number" refers to any number which can be expressed as the quotient or fraction (e.g., p/q) of two integers (e.g., p and q), with the denominator (e.g., q) not equal to zero. Example rational numbers include, but are not limited to, 1, 1.1, 1.52, 2, 2.5, 3, 3.12, and 7.

As used herein, the term "primary peaks" refers to (2Θ) positions on the x-axis of an XRD powder pattern of intensity v. degrees (2Θ) which have a peak intensity substantially greater than the background. In some Examples, primary peaks are those peaks in FIG. 4 which have an intensity value greater than 80. Primary peaks include, but are not limited to, those peaks in FIG. 4 which have an intensity value greater than 180. In a series of XRD powder pattern peaks, the primary peak is the peak of highest intensity which is associated with the compound, or phase, being analyzed. The second primary peak is the peak of second highest intensity. The third primary peak is the peak of third highest intensity. In some examples, a primary peak has a 5:1 or a 3:1 intensity to background ratio for the intensity of the peak with respect to background. In these examples, the background or noise level is the standard deviation of all data points where there is no primary peak.

As used herein, the term "reflections" refers to positions on the x-axis of an XRD powder pattern of intensity v. degrees (2Θ) which have a peak intensity greater than the background.

As used herein, the phrase "having the following reflections," refers to a characteristic of a material in which if the material is analyzed by XRD, according to the analytical methods set forth herein, the material will be observed to have an XRD powder pattern which includes the recited reflections at positions on the x-axis of an XRD powder pattern of intensity as a function of degrees (2Θ).

As used herein, the term, "argyrodite," or "argyrodite crystal," refers to a crystal structure or crystal bonding arrangement. This crystal structure or bonding arrangement is based on the crystal structure for the natural mineral, argyrodite, which is a silver germanium sulfide mineral characterized by the chemical formula $Ag_8GeS_6$. This crystal structure is also exemplified by the isomorphous argyrodite mineral, $Ag_8SnS_6$.

As used herein, the molar ratios, unless specified to the contrary, describe the ratio of constituent elements as batched in the reaction used to make the described material.

As used herein, a "thickness" by which is film is characterized refers to the distance, or median measured distance, between the top and bottom faces of a film. As used herein, the top and bottom faces refer to the sides of the film having the largest surface area. As used herein, the phrase "film thickness" refers to the distance, or median measured distance, between the top and bottom faces of a film.

As used herein the phrase "active electrode material," or "active material," refers to a material that is suitable for use as a Li rechargeable battery and which undergoes a chemical reaction during the charging and discharging cycles. For example, an "active cathode material," includes a metal fluoride that converts to a metal and lithium fluoride during the discharge cycle of a Li rechargeable battery. For example, an "active cathode material," includes an oxide set forth in U.S. Pat. No. 6,677,082; 6,680,143; 6,660,432; 6,964,828; 7,078,128; or 8,241,791.

As used herein the phrase "active anode material" refers to an anode material that is suitable for use in a Li rechargeable battery that includes an active cathode material as defined above. In some examples, the active material is Lithium metal. In some of the methods set forth herein, the sintering temperatures are high enough to melt the Lithium metal used as the active anode material.

As used herein the phrase "free-standing thin film," refers to a film that is not adhered or supported by an underlying substrate. In some examples, free-standing thin film is a film that is self-supporting, which can be mechanically manipulated or moved without need of substrate adhered or fixed thereto.

As used herein, the phrase "porosity as determined by SEM," refers to measurement of density by using an image analysis software. First, a user or software assigns pixels and/or regions of an image as porosity. Second, the area fraction of those regions is summed. Finally, the porosity fraction determined by SEM is equal to the area fraction of the porous region of the image.

As used herein, the phrase "density as determined by geometric measurements," refers to measurements of density obtained by physical mass and volume measurements. Density is determined by the ratio of measured mass to the measured volume. Customary techniques including the Archimedes method have been employed for such determinations.

As used herein, the phrase "$LiBH_4$—$LiNH_2$—LiX," refers to a tertiary composition that includes $LiBH_4$, $LiNH_2$, and LiX, and is described chemically as $A.(LiBH_4).B.(LiX).C.(LiNH_2)$, wherein X is fluorine, bromine, chloride, iodine, or a combination thereof, and wherein $0.1 \leq A \leq 3$, $0.1 \leq B \leq 4$, and $0 \leq C \leq 9$. The relative molar ratio of $LiBH_4$, $LiNH_2$, and LiX can vary. Example compositions include, but are not limited to, $3LiBH_4.2LiI.3LiNH_2$ and $3LiBH_4.4LiI.9LiNH_2$. In some examples, the $LiBH_4$, $LiNH_2$, and LiX are intimately mixed to form a uniformly mixed composition. In other examples, the $LiBH_4$, $LiNH_2$, and LiX are layered one on top of the other for form a layered thin film. In other examples, the $LiBH_4$, $LiNH_2$, and LiX are graded in a thin film so that their compositions vary across the thickness of the film. Exemplary composition and thin films are set forth in U.S. Provisional Patent Application No. 62/411,464, filed Oct. 21, 2016, the entire contents of which are herein incorporated by reference in its entirety for all purposes.

Compositions

In some examples, set forth herein is an electrolyte including a compound characterized by $Li_xP_yS_zI_t$, wherein $5 \leq x \leq 12$; $1 \leq y \leq 3$; $5 \leq z \leq 12$, and $0.1 \leq t \leq 2$. In these examples, subscripts x, y, z, and t are rational numbers and are chosen such that the compound is neutrally charged. In some examples, the compound is characterized by an x-ray powder diffraction (XRD) pattern having at least one of the following reflections at: 20, 25, 27, 29, or 45±1° (2Θ). In some examples, the compound is characterized by an x-ray powder diffraction (XRD) pattern having at least a reflections at: 20±1° (2Θ). In some examples, the compound is characterized by an x-ray powder diffraction (XRD) pattern having at least a reflection at: 25±1° (2Θ). In some examples, the compound is characterized by an x-ray powder diffraction (XRD) pattern having at least a reflections at: 27±1° (2Θ). In some examples, the compound is characterized by an x-ray powder diffraction (XRD) pattern having at least a reflection at: 29±1° (2Θ). In some examples, the compound is characterized by an x-ray powder diffraction (XRD) pattern having at least a reflections at: 45±1° (2Θ). In some examples, the compound is characterized by an x-ray powder diffraction (XRD) pattern having at least the following reflections at: 20, 25, 27, 29, and 45±1° (2Θ). In some examples, the compound is characterized by an XRD pattern having at least the following primary peaks at 20, 25, 27, 29, and 45 (2Θ).

In some examples, the LPSI compound set forth herein is characterized by an XRD pattern having at least the following primary peaks at 20, 25, 27, 29, and 45 (2Θ). In some examples, the LPSI compound set forth herein is characterized by an XRD pattern having at least the following primary peaks at 25, 27, 29, and 45 (2Θ). In some examples, the LPSI compound set forth herein is characterized by an XRD pattern having at least the following primary peaks at 20, 27, 29, and 45 (2Θ). In some examples, the LPSI compound set forth herein is characterized by an XRD pattern having at least the following primary peaks at 20, 25, 29, and 45 (2Θ). In some examples, the LPSI compound set forth herein is characterized by an XRD pattern having at least the following primary peaks at 20, 25, 27, and 45 (2Θ). In some examples, the LPSI compound set forth herein is characterized by an XRD pattern having at least the following primary peaks at 20, 25, 27, and 29 (2Θ). In some examples, the LPSI compound set forth herein is characterized by an XRD pattern having at least the following primary peaks at 20, 25, and 27 (2Θ). In some examples, the LPSI compound set forth herein is characterized by an XRD pattern having at least the following primary peaks at 20, 25, and 29 (2Θ). In some examples, the LPSI compound set forth herein is characterized by an XRD pattern having at least the following primary peaks at 20 and 25 (2Θ). In some examples, the LPSI compound set forth herein is characterized by an XRD pattern having at least the following primary peaks at 20 and 27 (2Θ). In some examples, the LPSI compound set forth herein is characterized by an XRD pattern having at least the following primary peaks at 20 and 29 (2Θ). In some examples, the LPSI compound set forth herein is characterized by an XRD pattern having at least the following primary peaks at 20 and 45 (2Θ). In some examples, the LPSI compound set forth herein is characterized by an XRD pattern having at least the following primary peaks at 20 and 45 (2Θ). In some examples, the LPSI compound set forth herein is characterized by an XRD pattern having at least the following primary peaks at 29 and 45 (2Θ). In some examples, the LPSI compound set forth herein is characterized by an XRD pattern having at least the following primary peaks at 27 and 45 (2Θ). In some examples, the LPSI compound set forth herein is characterized by an XRD pattern having at least the following primary peaks at 25 and 45 (2Θ).

In some examples, the LPSI compound set forth herein is characterized by an XRD pattern having a primary peak at 20 (2Θ). In certain examples, primary peak at 20 (2Θ) has a full-width at half-maximum (FWHM) of 5°±1°. In certain examples, primary peak at 20 (2Θ) has a full-width at half-maximum (FWHM) of 4°±1°. In certain examples, primary peak at 20 (2Θ) has a full-width at half-maximum (FWHM) of 3°±1°. In certain examples, primary peak at 20 (2Θ) has a full-width at half-maximum (FWHM) of 2°±1°. In certain examples, primary peak at 20 (2Θ) has a full-width at half-maximum (FWHM) of 1°±1°. In certain examples, primary peak at 20 (2Θ) has a full-width at half-maximum (FWHM) of 0.5°.

In some examples, the LPSI compound set forth herein is characterized by an XRD pattern having a primary peak at 25 (2Θ). In certain examples, primary peak at 25 (2Θ) has a full-width at half-maximum (FWHM) of 5°±1°. In certain examples, primary peak at 25 (2Θ) has a full-width at half-maximum (FWHM) of 4°±1°. In certain examples, primary peak at 25 (2Θ) has a full-width at half-maximum (FWHM) of 3°±1°. In certain examples, primary peak at 25 (2Θ) has a full-width at half-maximum (FWHM) of 2°±1°. In certain examples, primary peak at 25 (2Θ) has a full-width at half-maximum (FWHM) of 1°±1°. In certain examples, primary peak at 25 (2Θ) has a full-width at half-maximum (FWHM) of 0.5°.

In some examples, the LPSI compound set forth herein is characterized by an XRD pattern having a primary peak at 27 (2Θ). In certain examples, primary peak at 27 (2Θ) has a full-width at half-maximum (FWHM) of 5°±1°. In certain examples, primary peak at 27 (2Θ) has a full-width at half-maximum (FWHM) of 4°±1°. In certain examples, primary peak at 27 (2Θ) has a full-width at half-maximum (FWHM) of 3°±1°. In certain examples, primary peak at 27 (2Θ) has a full-width at half-maximum (FWHM) of 2°±1°. In certain examples, primary peak at 27 (2Θ) has a full-width at half-maximum (FWHM) of 1°±1°. In certain examples, primary peak at 27 (2Θ) has a full-width at half-maximum (FWHM) of 0.5°.

In some examples, the LPSI compound set forth herein is characterized by an XRD pattern having a primary peak at 29 (2Θ). In certain examples, primary peak at 29 (2Θ) has a full-width at half-maximum (FWHM) of 5°±1°. In certain examples, primary peak at 29 (2Θ) has a full-width at half-maximum (FWHM) of 4°±1°. In certain examples, primary peak at 29 (2Θ) has a full-width at half-maximum (FWHM) of 3°±1°. In certain examples, primary peak at 29 (2Θ) has a full-width at half-maximum (FWHM) of 2°±1°. In certain examples, primary peak at 29 (2Θ) has a full-width at half-maximum (FWHM) of 1°±1°. In certain examples, primary peak at 29 (2Θ) has a full-width at half-maximum (FWHM) of 0.5°.

In some examples, the LPSI compound set forth herein is characterized by an XRD pattern having a primary peak at 45 (2Θ). In certain examples, primary peak at 45 (2Θ) has a full-width at half-maximum (FWHM) of 5°±1°. In certain examples, primary peak at 45 (2Θ) has a full-width at half-maximum (FWHM) of 4°±1°. In certain examples, primary peak at 45 (2Θ) has a full-width at half-maximum (FWHM) of 3°±1°. In certain examples, primary peak at 45 (2Θ) has a full-width at half-maximum (FWHM) of 2°±1°. In certain examples, primary peak at 45 (2Θ) has a full-width at half-maximum (FWHM) of 1°±1°. In certain examples, primary peak at 45 (2Θ) has a full-width at half-maximum (FWHM) of 0.5°.

In some examples, the composition is characterized by a first major XRD peak at 29° (2Θ) which has a full-width at half-maximum (FWHM) of 3°±1° degrees.

In some examples, set forth herein is an electrolyte including a compound characterized by $Li_xP_yS_zI_t$, wherein $5 \leq x \leq 12$; $1 \leq y \leq 3$; $5 \leq z \leq 12$, and $0.1 \leq t \leq 2$. In some of these examples, x is 5, 6, 7, 8, or 9. In some of these examples, x is 7, 8, or 9. In some of these examples, x is 6.8, 6.9, 7.0, 7.1, 7.2, 7.3, 7.4, 7.5, or 7.6. In some examples, y is 1, 2, or 3. In other examples, y is 1. In other examples, y is 2. In other examples, y is 3. In some examples, z is 5, 6, 7, 8, 9, 10, 11, or 12. In other examples, z is 5. In other examples, z is 6. In other examples, z is 7. In other examples, z is 8. In other examples, z is 9. In other examples, z is 10. In other examples, z is 11. In other examples, z is 12. In some examples, t is 0.1, 0.2, 0.3, 0.4, 0.5, 0.6, 0.7, 0.8, 0.9, 1.0, 1.1, or 1.2, 1.3, 1.4, 1.5, 1.6, 1.7, 1.8, 1.9, or 2.0. In other examples, t is 0.1. In other examples, t is 0.2. In other examples, t is 0.3. In other examples, t is 0.4. In other examples, t is 0.5. In other examples, t is 0.6. In other examples, t is 0.7. In other examples, t is 0.8. In other examples, t is 0.9. In other examples, t is 1.0. In other examples, t is 1.1. In other examples, t is 1.2. In other examples, t is 1.3. In other examples, t is 1.4. In other examples, t is 1.5. In other examples, t is 1.6. In other examples, t is 1.7. In other examples, t is 1.8. In other examples, t is 1.9. In other examples, t is 2.0.

In some examples, the compound is characterized the composition claimed does not have a chemical formula characterized by a member selected from the group consisting of $(Li_3PS_4)3(LiI)$, $(Li_3PS_4)2(LiI)$, $(Li_3PS_4)(LiI)$, $2(Li_3PS_4)(LiI)$, $3(Li_3PS_4)(LiI)$, and combinations thereof. In these examples, and those below, the coefficient numbers are to be read as qualifying the parenthetical which the coefficient number precedes. For example, the formula $(Li_3PS_4)3(LiI)$ includes the coefficient "1" before $(Li_3PS_4)$ and the coefficient "3" before (LiI). These coefficient numbers refer to the respective amounts of the chemical units defined by the parentheticals. $(Li_3PS_4)3(LiI)$ therefore refers to a composition that includes one (1) chemical unit of $(Li_3PS_4)$ for every three (3) chemical units of (LiI). Within a parenthetical, the subscript values refer to the respective amounts of each constituent element in the chemical unit defined by the parenthetical. For example, the parenthetical $(Li_3PS_4)$ includes the subscript values "3," "1," and "4." The subscript numbers are to be read as qualifying the constituent element which precedes the subscript. Thus, within any given chemical unit of $(Li_3PS_4)$, there are three (3) lithium atoms for every one (1) phosphorus atom and for every four (4) sulfur atoms.

In some examples, the composition claimed does not have a chemical formula characterized by a member selected from the group consisting of $Li_7P_2S_8I$, $Li_6PS_5F$, $Li_6PS_5Cl$, $Li_6PS_5Br$, $Li_6PS_5I$, and combinations thereof. In some examples, the composition claimed does not have a chemical formula characterized by $Li_7P_2S_8I$. In some examples, the composition claimed does not have a chemical formula characterized by $Li_6PS_5F$. In some examples, the composition claimed does not have a chemical formula characterized by $Li_6PS_5Cl$. In some examples, the composition claimed does not have a chemical formula characterized by $Li_6PS_5Br$. In some examples, the composition claimed does not have a chemical formula characterized by $Li_6PS_5I$. In some examples, the composition claimed does not have a chemical formula characterized by a member selected from the group consisting of $Li_7P_2S_8I$, $Li_6PS_5F$, $Li_6PS_5Cl$, $Li_6PS_5Br$, $Li_6PS_5I$, and combinations thereof, and wherein the composition is not annealed as described in the instant application. In some examples, the composition claimed does not have a chemical formula characterized by a member selected from the group consisting of $Li_7P_2S_8I$, $Li_6PS_5F$, $Li_6PS_5Cl$, $Li_6PS_5Br$, $Li_6PS_5I$, and combinations thereof, and wherein the composition is composed of mostly crystalline $Li_7P_2S_8I$, $Li_6PS_5F$, $Li_6PS_5Cl$, $Li_6PS_5Br$, or $Li_6PS_5I$.

In some examples, the compound is characterized the composition claimed does not have a chemical formula characterized by a member selected from the group consisting of $80(70L_2S.30P_2S_5)20(LiI)$, $70(70L_2S.30P_2S_5)30(LiI)$, and combinations thereof.

In some examples, the compound is characterized the composition claimed does not have a chemical formula characterized by a solid solution of $L_3PS_4$ and LiI, $Li_2S$, and $P_2S_5$.

In some examples, the compound is characterized the composition claimed does not have a chemical formula characterized by $(100-X)(80L_2S.20P_2S_5)X(LiI)$, wherein X is 0, 2, 5, 10, 15, 20 or 30.

In some examples, the compound is characterized the composition claimed does include a mixture of any of $Li_2S$, $P_2S_5$, LiF, LiCl, LiBr, and/or LiI or combinations thereof.

In some examples, the compound is not $Li_7P_2S_8I$ but is characterized by an x-ray powder diffraction (XRD) pattern having at least one of the following reflections at: 21, 28, or 33 (2Θ).

In some examples, the compound is not argyrodite $Li_6PS_5I$. In some examples, the compound is not argyrodite $Li_6PS_5I$ having a primary XRD peak at 46 (2Θ).

Composites

In some examples, the electrolyte compositions described herein include a LPSI, described herein, and further include a polymer.

In some examples, the weight loading of the LPSI in the composition further comprising a polymer is at least 50 (w/w). In some other examples, the weight loading of the LPSI in the composition further comprising a polymer is at least 55 (w/w). In some examples, the weight loading of the LPSI in the composition further comprising a polymer is at least 60% (w/w). In some other examples, the weight loading of the LPSI in the composition further comprising a polymer is at least 65% (w/w). In some examples, the weight loading of the LPSI in the composition further comprising a polymer is at least 70% (w/w). In some other examples, the weight loading of the LPSI in the composition further comprising a polymer is at least 75% (w/w). In some examples, the weight loading of the LPSI in the composition further comprising a polymer is at least 80% (w/w). In some other examples, the weight loading of the LPSI in the composition further comprising a polymer is at least 85% (w/w). In some examples, the weight loading of the LPSI in the composition further comprising a polymer is at least 90% (w/w). In some other examples, the weight loading of the LPSI in the composition further comprising a polymer is at least 95 (w/w).

In some examples, the volume loading of the LPSI in the composition further comprising a polymer is at least 50% (v/v). In some other examples, the volume loading of the LPSI in the composition further comprising a polymer is at least 55% (v/v). In some examples, the volume loading of the LPSI in the composition further comprising a polymer is at least 60% (v/v). In some other examples, the volume loading of the LPSI in the composition further comprising a polymer is at least 65% (v/v). In some examples, the volume loading of the LPSI in the composition further comprising a polymer is at least 70% (v/v). In some other examples, the volume loading of the LPSI in the composition further comprising a polymer is at least 75% (v/v). In some examples, the volume loading of the LPSI in the composition further comprising a polymer is at least 80% (v/v). In some other examples, the volume loading of the LPSI in the composition further comprising a polymer is at least 85% (v/v). In some examples, the volume loading of the LPSI in the composition further comprising a polymer is at least 90% (v/v). In some other examples, the volume loading is at least 95% (v/v).

In some examples, the LPSI composition further comprises a polymer and further includes a lithium salt selected from $LiPF_6$.

In some examples, the LPSI composition further comprises a polymer and further includes a lithium salt selected from LiTFSI (lithium bis-trifluoromethanesulfonimide).

In some examples, the polymer suitable for use with the compositions and methods set forth herein include polypropylene (PP), atactic polypropylene (aPP), isotactic polypropylene (iPP), polybutyl diene, polybutadiene (PBD), polybutadiene rubber (PB), cross-linked polybutadiene (cPBD), polystyrene (PS), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), poly methyl-methacrylate, acrylics, acrylonitrile-butadiene rubber (NBR), polyvinyl acetacetal resin, polyvinylbutylal resin, PVB stereoblock polypropylenes, polypropylene polymethylpentene copolymer, polyethylene oxide (PEO), PEO block copolymers, nitriles, nitrile butadiene rubber, carboxymethyl cellulose (CMC), polyisoprene rubber (PI), polychloroprene rubber (CR), polyethyl acrylate (PEA), polyvinylidene fluoride (PVDF), aqueous-compatible polymers, silicone, PMX-200 (polydimethylsiloxane, PDMS), methyl methacrylate, ethyl methacrylate, polyvinylbutyral (PVB), poly ethyl methacrylate (PEMA), polyvinyl pyrrolidone (PVP), stereo block polypropylenes, polypropylene polymethylpentene copolymer, polypropylene carbonate, polyethylene, or combinations thereof.

In some examples, the polymer suitable for use with the compositions and methods set forth herein include polymers which attach, bond, adhere, or adsorb to the LPSI. In some examples, the polymer suitable for use with the compositions and methods set forth herein include polymers which attach, bond, adhere, or adsorb to the surface of the LPSI.

Examples binders and/or polymers are also, in certain embodiments, selected from nitriles, nitrile butadiene rubber, carboxymethyl cellulose (CMC), styrene butadiene rubber (SBR), PVDF-HFP, PAN, aqueous-compatible polymers, atactic polypropylene (aPP), silicone, polyisobutylene (PIB), ethylene propylene rubber (EPR), PMX-200 PDMS (polydimethylsiloxane/polysiloxane, i.e., PDMS or silicone), polyacrylonitrile (PAN), polymethylmethacrylate (PMMA), poly vinylchloride (PVC), poly vinylbutyral (PVB), or poly(vinylidene) fluoride-hexafluoropropylene PVDF-HFP.

In some examples, the polymer is linear low density polyethylene (LLDPE). In some examples, the polymer is polybutadiene (PBD).

In some examples, the polymers are coordinated or adsorbed to the surface of LPSI particles. In some examples, the polymers are coordinated or adsorbed to the surface of the LPSI particles. Polymers which covalently attach to LPSI particles, include, but are not limited to, carboxylic acids, esters, ethers, and polymers with hydroxyl, amine, pyridine, amide, nitrile, phosphate, sulfonate, thioether, and thiol functional groups. Example carboxylic acids include, but are not limited to, decanoic acid and perfluoropentanoic acid. Example esters include, but are not limited to, dodecyl acetate, ethyl decanoate, and ethyl perfluorobutyrate. Example ethers include, but are not limited to, diethyl ether. Example polymers with hydroxyl, amine, pyridine, amide, nitrile, phosphate, sulfonate, thioether, and thiol functional groups include, but are not limited to, dodecylamine, phenylpropylpyridine, octadecanamide, nonanenitrile, triphenylphospine oxide, perfluorobutanesulfonic acid, dodecyl sulfide, and dodecanethiol.

Electrochemical Cells

As shown in FIG. 1 as one example, set forth herein are electrochemical cells. In some examples, these electrochemical cells are solid-state cells. In FIG. 1, "eLi" refers to evaporated Li metal. In FIG. 1, HP-LPSI refers to hot-pressed LPSI. In FIG. 1, NMC refers to nickel-manganese cobalt oxide. In some of these solid-state electrochemical cells, the electrolyte which separates the positive and negative electrodes comprises a sulfide-based electrolyte. In some examples, this sulfide-based electrolyte is included in the electrochemical cell as a single separator membrane which is positioned between the positive and negative electrodes. In some of these examples, this separator membrane consists essentially of an LPSI material which includes $Li_xP_yS_zI_t$, wherein $5 \leq x \leq 12$; $1 \leq y \leq 3$; $5 \leq z \leq 9$, and $0.1 \leq t \leq 2$, and is characterized by an x-ray powder diffraction (XRD) pattern having at least one of the following reflections at: 21, 25, 27, 28, 29, 33 and/or 45±1° (2Θ). In these compositions, subscripts x, y, z, and t are rational numbers and the compound is neutrally charged.

In some examples, the separator membrane includes two layers, one layer being LPSI and one layer being SLOPS, as defined herein. In certain examples, one of the two layers in this separator is an LSTPS material which includes, for example, a material described in U.S. Patent Application Publication No. 2015/0171465, which published on Jun. 18, 2015, entitled SOLID STATE CATHOLYTE OR ELECTROLYTE FOR BATTERY USING $Li_AMP_BS_C$ (M=Si, Ge, AND/OR Sn), or U.S. Pat. No. 9,172,114, which issued Oct. 27, 2015, the contents of which are incorporated by reference in their entirety. In certain examples, the other of the two layers in this separator is an SLOPS material described herein. In some examples, the LPSI material is hot pressed with the SLOPS material to make a bi-layer solid state electrolyte membrane. In some examples, the LPSI material is hot pressed with the LSS material to make a bi-layer solid state electrolyte membrane. In one example, the LPSI composition is $Li_{7.4}P_{1.6}S_{7.2}I$, while the LSS is 60:40 mole ratio $Li_2S:SiS_2$. In one example, the LPSI composition is $Li_{7.4}P_{1.6}S_{7.2}I$, while the SLOPS is 60:40 mole ratio $Li_2S:SiS_2$ with 0.1 mol. % $Li_3PO_4$ or greater. The LPSI is pre-annealed at 190° C. prior to assembly. The SLOPS is not annealed. To create the bi-layer separator, LPSI powder is first added to a mold, followed by application of 50,000 pounds per square inch (psi) of pressure. To one side of this condensed electrolyte membrane, set forth herein, of LPSI, SLOPS powder is added in a 2:1 LPSI:SLOPS ratio, followed by heating to 180-210° and application of ~100,000 psi pressure for 5 minutes. The bi-layer separator is allowed to cool and is removed as a freestanding film or electrolyte membrane, set forth herein.

In some of these examples, and as illustrated in FIG. 1, the positive electrode is prepared by casting a slurry onto a current collector. The slurry includes NMC cathode active materials. Example NMC materials are set forth in U.S. Pat. Nos. 6,680,143; 6,677,082; 8,685,565; 8,241,791; 7,078,128; and 6,964,828, or in US Patent Application Publication No. 2011/0250508, filed Oct. 13, 2009. In some examples, the current collector is selected from a metal or alloy selected from nickel (Ni), aluminum (Al), copper (Cu), gold (Au), silver (Ag), platinum (Pt), chromium (Cr), steel, stainless steel, and combinations thereof. In some of these examples, the slurry includes an LSTPS catholyte material which has been downsized. In some examples, the LSTPS is downsized by milling it in a grinding media and a solvent. In some examples, the grinding media is zirconia, alumina, lanthanum oxide, or combinations thereof. In some examples, the solvent is tetrahydrofuran, ethanol, methanol, isopropanol, ethyl acetate, dodecane, dimethyl sulfoxide, dimethyl formamide, or acetonitrile. In some examples, additives may further be added to the solvent, such as dodecyl sulfide, dodecyl methyl sulfide, or a silane. In some examples, the NMC is milled simultaneously with the LSTPS. In some examples, the LSTPS is milled but the NMC is not milled. In some examples, both the NMC and the LSTPS are milled but in separate milling jars. To prepare the electrochemical cell set forth in this example, the NMC is combined with LSTPS is a 5:1 weight ratio in the slurry cast onto the cathode. In some examples, the slurry includes a solvent. In some examples, the slurry includes a binder and a source of carbon as a conductive additive. In some examples, the carbon is C65. In other examples, the carbon is ketjen black, carbon fibers, vapor grown carbon fibers (VGCF), acetylene black, graphite, graphene, carbon nanotubes, carbon nanofibers, activated carbon, carbon black, fullerenes, or acetylene black.

In some examples, the milling includes wet milling and/or wet mixing. In some of these examples, the wet milling and/or wet mixing includes the use of a solvent selected from dodecane, toluene, hexane, heptane, decane, acetonitrile, tetrahydrofuran (THF), propanol, ethanol, methanol, butyl acetate, isopropyl acetate, acetic acid, ethyl acetate, or dimethyl formamide (DMF). In some examples, the solvent is dodecane. In some examples, the solvent is toluene. In some examples, the solvent is acetonitrile. In some examples, the solvent is THF. In some examples, the solvent is propanol. In some examples, the solvent is ethanol. In some examples, the solvent is acetic acid. In some examples, the solvent is methanol. In some examples, the solvent is hexane. In some examples, the solvent is heptane. In some examples, the solvent is decane. In some examples, the solvent is ethyl acetate. In some examples, the solvent is DMF. In some examples, the milling is conducted at a speed ratio of 1:–1, 1:–2, 1:–3, or 1:–4. In some examples, the milling is conducted for one (1) to forty-eight (48) hours.

The slurry used to prepare the positive electrode composition shown in FIG. 1. consisted of 74 wt. % NMC, 17 wt. % LSTPS, 5 wt. % binder, 3 wt. % C65 carbon, and 1 wt. % Ketjen Black carbon. In this slurry, the LSTPS was combined with NMC in a NMC:LSTPS weight ratio of 5:1.

Once formulated, the slurry is cast onto a positive electrode current collector. In some examples, after the slurry is cast, the slurry is dried to remove the solvent which dissolved or suspended the LSTPS, NMC, carbon, and/or binder.

In some examples, and as illustrated in FIG. 1, a dried slurry cast of 12 mm diameter disc cathode active materials is positioned on a current collector. In certain examples, this 12 mm diameter disc of a dried slurry cast on a current collector is layered with, or laminated to, a layer of LPSI. In certain other examples, this 12 mm diameter disc of dried slurry is on a current collector and is layered with, or laminated to, a bi-layer of LPSI & SLOPS/LSS. In these examples, the cathode active region includes a 5:1 weight ratio of NMC and LSTPS. Once the electrochemical cell is charged, and a layer of Li metal is between the negative electrode current collector and the electrolyte, the Li metal will be in direct contact with the LPSI layer. In some of these examples, the dried slurry cast on the current collector is layered with, or laminated to, a layer of LPSI or a bi-layer of LPSI & SLOPS/LSS, and the resulting composite is hot pressed. In this hot press step, the layers of current collector, cathode active region, and LPSI are heated and compressed. In some of these examples, the heating of these layers is to at least 75, 80, 85, 90, 95, 100, 105, 110, 114, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300° C. In some other examples, the heating of these layers is to about 75, 80, 85, 90, 95, 100, 105, 110, 114, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300° C. In some other examples, the heating of these layers is to 75, 80, 85, 90, 95, 100, 105, 110, 114, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300° C.

In certain examples, the hot pressing includes applying pressure to the layered materials and composites described herein. The application of pressure can be uniaxial or uniform in all three dimensions. Static presses and calenders are useful for applying pressure to the layered materials and composites described herein. In some examples, the application of pressure includes applying 10, 15, 20, 25, 30, 35, 40, 45, 50, 55, 60, 65, 70, 75, 80, 85, 90, 95, 100, 105, 110, 114, 120, 125, 130, 135, 140, 145, 150, 155, 160, 165, 170, 175, 180, 185, 190, 195, 200, or 205 thousand pounds per square inch (kPSI).

In some examples, after hot pressing to the layered materials and composites described herein, Li metal is applied to the side of LPSI not directly interfacing with the cathode region (i.e., positive electrode). The Li metal may be applied through evaporation means, sputtering, lamination means, chemical bonding means, or other methods known for depositing Li metal. In some example, the Li metal is sputtered onto the LPSI. In some of these examples, a 10 mm Teflon mask is used during the evaporation or sputtering of Li metal onto the LPSI.

Other methods of interfacing solid electrolytes with lithium metal or with depositing, laminating, or contacting lithium metal to electrolytes may be known and the instant invention should not be limited to the particular lithium deposition, lamination, or contacting methods described herein.

Figure 11:
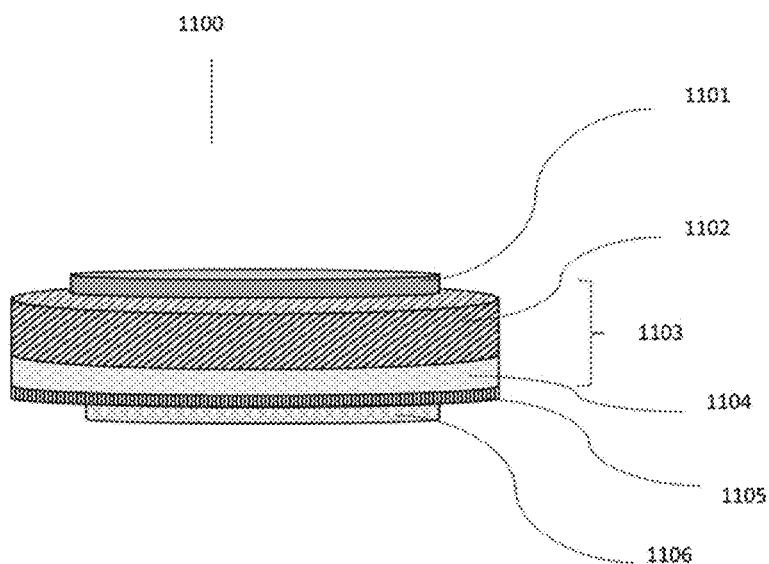
FIG. 11 shows an example solid-state electrochemical cell configuration having a double-layer (i.e., bi-layer) solid-state electrolyte membrane positioned between a gel-electrolyte containing cathode and a lithium metal anode.

As shown in FIG. 11, in some examples, the disclosure herein sets forth an electrochemical stack 1110 including a bi-layer solid state electrolyte 1103. The bi-layer solid state electrolyte 1103 includes layer 1102 which is a solid state anolyte or electrolyte which is chemically compatible with lithium metal. As shown in FIG. 11, layer 1102 of solid state electrolyte 1103 is in physical contact with the lithium metal anode 1101 when the electrochemical stack 1100 is at least partially charged. The solid state electrolyte 1103 also includes layer 1104 which is a solid state electrolyte which is chemically compatible with a gel catholyte 1105 or a cathode 1106 having a gel catholyte (e.g., 80:20 volume polymer:volume solvent HPVD-HFP polymer with 1M $LiPF_6$ salts in DC:EMC) therein. The total thickness of layer 1103 is approximately 1.2 mm, in which the positive electrode (cathode) facing side is approximately 0.45 mm and in which the negative electrode (anode) facing side is approximately 0.75 mm. The thickness of layer 1103 can be vary.

In some examples, layer 1102 is LPSI having the empirical formula $Li_{7.4}P_{1.6}S_{7.2}I$. In some examples, this LPSI material is chemically stable down to 0V. In some examples, layer 1112 is 1 nm, 2 nm, 3 nm, 4 nm, 5 nm, 6 nm, 7 nm, 8 nm, 9 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 125 nm, 150 nm, 175 nm, 200 nm, 250 nm, 300 nm, 350 nm, 400 nm, 450 nm, 500 nm, 0.6 μm, 0.7 μm, 0.8 μm, 0.9 μm, 1 μm, 2 μm, 3 μm, 4 μm, 5 μm, 6 μm, 7 μm, 8 μm, 9 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 125 μm, 150 μm, 175 μm, 200 μm, 250 μm, 300 μm, 350 μm, 400 μm, 450 μm, 500 μm in thickness. In some examples, layer 1102 is a disc or is disc-shaped and is 1, 2, 3, 4, 5, 6, 7, 8, 9, 10, 11, 12, 13, 14, 15, 16, 17, 18, 19, or 20 mm in disc diameter.

In some examples, layer 1102 is characterized by the general formula $x(80:20\ Li_2S:P_2S_5)*(1-x)(LiI)$, where x is 0.5-1.0. In some examples, x is 0.5, 0.55, 0.6, 0.65, 0.7, 0.75, 0.8, 0.85, 0.9, 0.95 or 1.0.

In some examples, layer 1104 is a material having Si, Li, O, P, and S elements. having the empirical formula $(1-x)(60:40Li_2S:SiS_2).(x)(Li_3PO_4)$, where $0.01 \le x \le 0.10$. The crystal structure is primarily amorphous besides peaks at 16.5°, 27.5°, 31.5°, 45°, and 53.5° attributable to crystalline fractions of $Li_2S$. In some examples, this SLOPS material is chemically stable down to 2V. In some examples, layer 1104 is 1 nm, 2 nm, 3 nm, 4 nm, 5 nm, 6 nm, 7 nm, 8 nm, 9 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 125 nm, 150 nm, 175 nm, 200 nm, 250 nm, 300 nm, 350 nm, 400 nm, 450 nm, 500 nm, 0.6 μm, 0.7 µm, 0.8 µm, 0.9 µm, 1 µm, 2 µm, 3 µm, 4 µm, 5 µm, 6 µm, 7 µm, 8 µm, 9 µm, 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 125 µm, 150 µm, 175 µm, 200 µm, 250 µm, 300 µm, 350 µm, 400 µm, 450 µm, 500 µm in thickness. In some examples, layer 1104 is a disc or is disc-shaped and is 1, 2, 3, 4, 5, 6, 7, 8, 9, 10, 11, 12, 13, 14, 15, 16, 17, 18, 19, or 20 mm in disc diameter.

In some examples, layer 1104 is characterized by the general formula $Li_6Si_2S_7$.

In some examples, layer 1104 is characterized as a 60:40 mixture of $Li_2S:SiS_2$. In some examples, layer 1104 is characterized as a 50:50 mixture of $Li_2S:SiS_2$. In some examples, layer 1104 is characterized as a 2:1 mixture of $Li_2S:SiS_2$.

In some examples, layer 1105 is a gel electrolyte. In some examples, the gel electrolyte is prepared by dissolving a polymer (e.g. 0.9 gms of PVDF-HFP, Kynar 2801) in an appropriate solvent (e.g. 8.5 gms of tetrahydrofuran, THF) and adding a quantity of an appropriate electrolyte solution (e.g. 2.8 gms of EC:PC (1:1), 1M $LiPF_6$). This mixture is stirred at 60° C. for 4 hrs to dissolve the polymer and is then cast on glass using a doctor blade. Once the solvent evaporates the gel film can be released from the glass and used as layer 1105. In some examples, layer 1105 is a gel catholyte which includes a solvent selected from the group consisting of ethylene carbonate (EC), propylene carbonate (PC), dimethyl carbonate (DMC), methylene carbonate, and combinations thereof. In some examples, layer 1105 is a gel catholyte which includes a polymer selected from the group consisting of PVDF-HFP and PAN. In some examples, layer 1105 is a gel catholyte which includes and a salt selected from the group consisting of $LiPF_6$, LiBOB [Lithium bis(oxatlato)borate], and LFTSi. In some examples, the concentration of the salt is 0.5 M to 2M. In some examples, other suitable polymers include Kynar 2801 and HSV 900 from Arkema. In some examples, the volume ratio of polymer to solvent in the gel is 90:10. In some examples, the polymer is about 150,000 Da in molecular weight.

Methods of Making Annealed LPSI

In some examples, set forth herein are methods of making electrolyte compositions which include Li, P, S, and I elements (herein "LPSI"). In some examples, the compositions include $Li_xP_yS_zI_t$, wherein 5≤x≤12; 1≤y≤3; 5≤z≤12, and 0.1≤t≤2; and characterized by an x-ray powder diffraction (XRD) pattern having at least one of the following reflections at: 21, 25, 27, 28, 29, 33 or 45±1° (2Θ). In these compositions, subscripts x, y, z, and t are rational numbers and the compound is neutrally charged.

In some of the methods set forth herein, the methods include providing chemical precursors to LPSI. In some examples, the chemical precursors include lithium metal, lithium powder, lithium sulfide, phosphorus sulfide, and lithium iodide.

In some examples, the disclosure here sets forth a method of making an electrolyte, wherein the electrolyte is characterized by $Li_xP_yS_zI_t$, and wherein 5≤x≤12; 1≤y≤3; 5≤z≤12, and 0.1≤t≤2. In some examples, the electrolyte is also characterized by an XRD pattern having at least one of the following reflections at: 20, 25, 27, 29, or 45 (2Θ). In these methods, the methods include providing a lithium sulfide compound, providing a phosphorous sulfide compound, providing a lithium iodide compound. In some examples, the methods also include mixing the lithium sulfide compound, phosphorus sulfide compound, and lithium iodide compound to form a mixture. Some examples, the methods include milling the mixture to form a milled mixture. In certain examples, the compounds included in the mixture are milled prior to be included in the mixture and subsequently milled as a mixture to form a milled mixture. In some examples, after the mixture is formed, the mixture is heated from about 100 to about 300° C. Prior to heating from about 100 to about 300° C., the milled mixture is referred to as an LPSI precursor.

In some examples, the lithium sulfide compound is $Li_2S$, elemental S, Li metal, or combinations thereof. The Li metal may be provided as a strip of metal, a block of metal, a metal powder, or metal filings. In some examples, the phosphorus sulfide compound is $P_2S_5$, red phosphorus, white phosphorus, phosphorus powder or $P_2O_5$ and elemental S. In some examples, the lithium iodide compound is selected from LiI, $I_2$, Li metal, or combinations thereof. In some examples, the lithium iodide compound is nanocrystalline, nanodimensioned, or amorphous LiI. In some examples, the lithium metal is nanocrystalline, nanodimensioned, or amorphous.

In some examples, the mixture includes $Li_2S:P_2S_5$ in a molar ratio of 1:1 to 5:1. In some other examples, the mixture includes $P_2S_5$:LiI in a molar ratio of 0.1:1 to 2:1. In some examples, the mixture includes $Li_2S:P_2S_5$:LiI in a molar ratio of 3.2:0.8:1.

In some examples, the milling step comprises milling the mixture until the mixture has particles with a $d_{50}$ particle size of 0.5 µm or less.

In some examples, the milling step comprises milling the mixture until the mixture is characterized by an XRD pattern in which crystalline LiI is not observed.

In some examples, the heating the mixture from about 100 to about 300° C. includes heating the mixture in an inert atmosphere, wherein the inert atmosphere is selected from nitrogen, argon, helium, xenon gas, or mixtures thereof. In some examples, the inert atmosphere is argon.

In any of the examples, herein, the heating the mixture step may include heating to 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300° C. for two (2) to twenty-four (24) hours. In some examples, the heating is to 150 to 250° C. In some examples, the heating is for one (1) to sixteen (16) hours.

In some examples, the heating, or annealing, includes heating the LPSI precursor to 150° C. for one (1) to six (6) hours. In some examples, the heating, or annealing, includes heating the LPSI precursor to 160° C. for one (1) to six (6) hours. In some examples, the heating, or annealing, includes heating the LPSI precursor to 170° C. for one (1) to six (6) hours. In some examples, the heating, or annealing, includes heating the LPSI precursor to 180° C. for one (1) to six (6) hours. In some examples, the heating, or annealing, includes heating the LPSI precursor to 190° C. for one (1) to six (6) hours. In some examples, the heating, or annealing, includes heating the LPSI precursor to 200° C. for one (1) to six (6) hours. In some examples, the heating, or annealing, includes heating the LPSI precursor to 210° C. for one (1) to six (6) hours. In some examples, the heating, or annealing, includes heating the LPSI precursor to 220° C. for one (1) to six (6) hours. In some examples, the heating, or annealing, includes heating the LPSI precursor to 230° C. for one (1) to six (6) hours. In some examples, the heating, or annealing, includes heating the LPSI precursor to 240° C. for one (1) to six (6) hours. In some examples, the heating, or annealing, includes heating the LPSI precursor to 250° C. for one (1) to six (6) hours. In some examples, the heating, or annealing, includes heating the LPSI precursor to 260° C. for one (1) to six (6) hours. In some examples, the heating, or annealing, includes heating the LPSI precursor to 270° C. for one (1) to six (6)

hours. In some examples, the heating, or annealing, includes heating the LPSI precursor to 280° C. for one (1) to six (6) hours. In some examples, the heating, or annealing, includes heating the LPSI precursor to 290° C. for one (1) to six (6) hours. In some examples, the heating, or annealing, includes heating the LPSI precursor to 300° C. for one (1) to six (6) hours.

In some examples, the heating, or annealing, includes heating the LPSI precursor to 150° C. for a time period less than the time required to completely crystallize the LPSI. In some examples, the heating, or annealing, includes heating the LPSI precursor to 160° C. for a time period less than the time required to completely crystallize the LPSI. In some examples, the heating, or annealing, includes heating the LPSI precursor to 170° C. for a time period less than the time required to completely crystallize the LPSI. In some examples, the heating, or annealing, includes heating the LPSI precursor to 180° C. for a time period less than the time required to completely crystallize the LPSI. In some examples, the heating, or annealing, includes heating the LPSI precursor to 190° C. for a time period less than the time required to completely crystallize the LPSI. In some examples, the heating, or annealing, includes heating the LPSI precursor to 200° C. for a time period less than the time required to completely crystallize the LPSI. In some examples, the heating, or annealing, includes heating the LPSI precursor to 210° C. for a time period less than the time required to completely crystallize the LPSI. In some examples, the heating, or annealing, includes heating the LPSI precursor to 220° C. for a time period less than the time required to completely crystallize the LPSI. In some examples, the heating, or annealing, includes heating the LPSI precursor to 230° C. for a time period less than the time required to completely crystallize the LPSI. In some examples, the heating, or annealing, includes heating the LPSI precursor to 240° C. for a time period less than the time required to completely crystallize the LPSI. In some examples, the heating, or annealing, includes heating the LPSI precursor to 250° C. for a time period less than the time required to completely crystallize the LPSI. In some examples, the heating, or annealing, includes heating the LPSI precursor to 260° C. for a time period less than the time required to completely crystallize the LPSI. In some examples, the heating, or annealing, includes heating the LPSI precursor to 270° C. for a time period less than the time required to completely crystallize the LPSI. In some examples, the heating, or annealing, includes heating the LPSI precursor to 280° C. for a time period less than the time required to completely crystallize the LPSI. In some examples, the heating, or annealing, includes heating the LPSI precursor to 290° C. for a time period less than the time required to completely crystallize the LPSI. In some examples, the heating, or annealing, includes heating the LPSI precursor to 300° C. for a time period less than the time required to completely crystallize the LPSI. In the examples, the minimum time period is at least five (5) or ten (10) minutes.

In some examples, after the LPSI is heating to an annealing temperature, the LPSI material is slowly cooled. In some examples, the LPSI is cooled at a rate of 10° per minute. In some examples, the LPSI is cooled at a rate of 9° per minute. In some examples, the LPSI is cooled at a rate of 8° per minute. In some examples, the LPSI is cooled at a rate of 7° per minute. In some examples, the LPSI is cooled at a rate of 6° per minute. In some examples, the LPSI is cooled at a rate of 5° per minute. In some examples, the LPSI is cooled at a rate of 4° per minute. In some examples, the LPSI is cooled at a rate of 3° per minute. In some examples, the LPSI is cooled at a rate of 2° per minute. In some examples, the LPSI is cooled at a rate of 1° per minute. In some examples, the LPSI is cooled at a rate of 0.5° per minute. In some examples, the LPSI is cooled at a rate of 0.25° per minute. In some examples, the LPSI is cooled at a rate of 0.1° per minute. In some examples, the LPSI is cooled at a rate of 0.01° per minute.

Some of the examples disclosed herein include mixing a polymer with the mixture to form a second mixture. In some of these examples, the methods include cryo-milling the polymer prior to the step of mixing the polymer with the mixture to form a second mixture.

In some examples, the LPSI precursor materials are evaporated, atomized, or volatilized from the solid or liquid state to the gas or plasma state and then rapidly cooled to form the LPSI materials described herein. For example, the LPSI materials can be prepared by the evaporative or vapor-phase methods described in PCT/US2014/041203, filed Jun. 6, 2014, which published as WO 2014/197751 on Dec. 11, 2014, and is entitled FLASH EVAPORATION OF SOLID STATE BATTERY COMPONENT. The content of each of these patent applications is herein incorporated by reference in their entirety for all purposes.

Annealing

In some examples, the annealing conditions include using an inert atmosphere in contact with the annealing LPSI materials. Suitable inert atmospheres include 100% Argon (Ar), Nitrogen ($N_2$), Helium (He), or Xenon (Xe). Suitable inert atmospheres include combinations or mixtures of Argon (Ar), Nitrogen ($N_2$), Helium (He) and/or Xenon (Xe). In some examples, the inert atmosphere is 100% Ar. In some examples, the inert atmosphere is 100% $N_2$. In some examples, the inert atmosphere is 100% He. In some examples, the inert atmosphere is 100% Xe. In some examples, the inter atmosphere includes a mixture of $H_2$ and Ar, $N_2$ or Xe. In some examples, the inter atmosphere includes a mixture of $H_2$ and Ar. In some examples, the inter atmosphere includes a mixture of $H_2$ and $N_2$. In some examples, the inter atmosphere includes a mixture of $H_2$ and Xe. In some examples, the inter atmosphere includes a mixture of $H_2$ and He.

In some examples, the annealed LPSI is milled after it is annealed. In some examples, the milling occurs in a solvent along with a milling media. In some of these examples, the solvent is selected from acetonitrile ($CH_3CN$), ethyl acetate, tetrahydrofuran (THF), or dodecane. In some of these examples, the weight ratio of milling media to LPSI is 5:1 or up to 7:1. In certain examples, the milling media is zirconia, alumina, or lanthanum oxide.

In some examples, the solid-state electrolytes and/or catholytes are milled to produce solid-state electrolytes or catholytes with reduced particle sizes, reduced crystallinity, reduced size of crystalline domains, or any combination thereof. In some examples, the electrolytes and catholytes are milled to $d_{50}$ particle sizes of about 0.310, 3.09, 2.58, 4.72, 0.650, 0.670, or 1.01 μm. In some examples, the electrolytes and catholytes are milled to $d_{90}$ particle sizes of about 1.28, 6.03, 5.03, 2.52, 1.14, 7.99, 1.49 μm.

EXAMPLES

For XRD analysis, the air-sensitive sulfide samples were loaded level into an air-tight Kapton film dome holder and measured with a Rigaku MiniFlex II X-ray Diffractometer. The diffractometer was set up with a 1.25 degree divergence and scattering slit, as well as a 0.3 mm receiving slit, with a graphite monochromator on a copper k-alpha x-ray tube. Samples were scanned from 10-60 degrees at 30 kV and 15 mA, with a sampling width of 0.020 degrees at a speed of 1.00 degrees/min.

Example 1—Method of Making Lithium-Phosphorus-Sulfur-Iodine ("LPSI")

Figure 2:
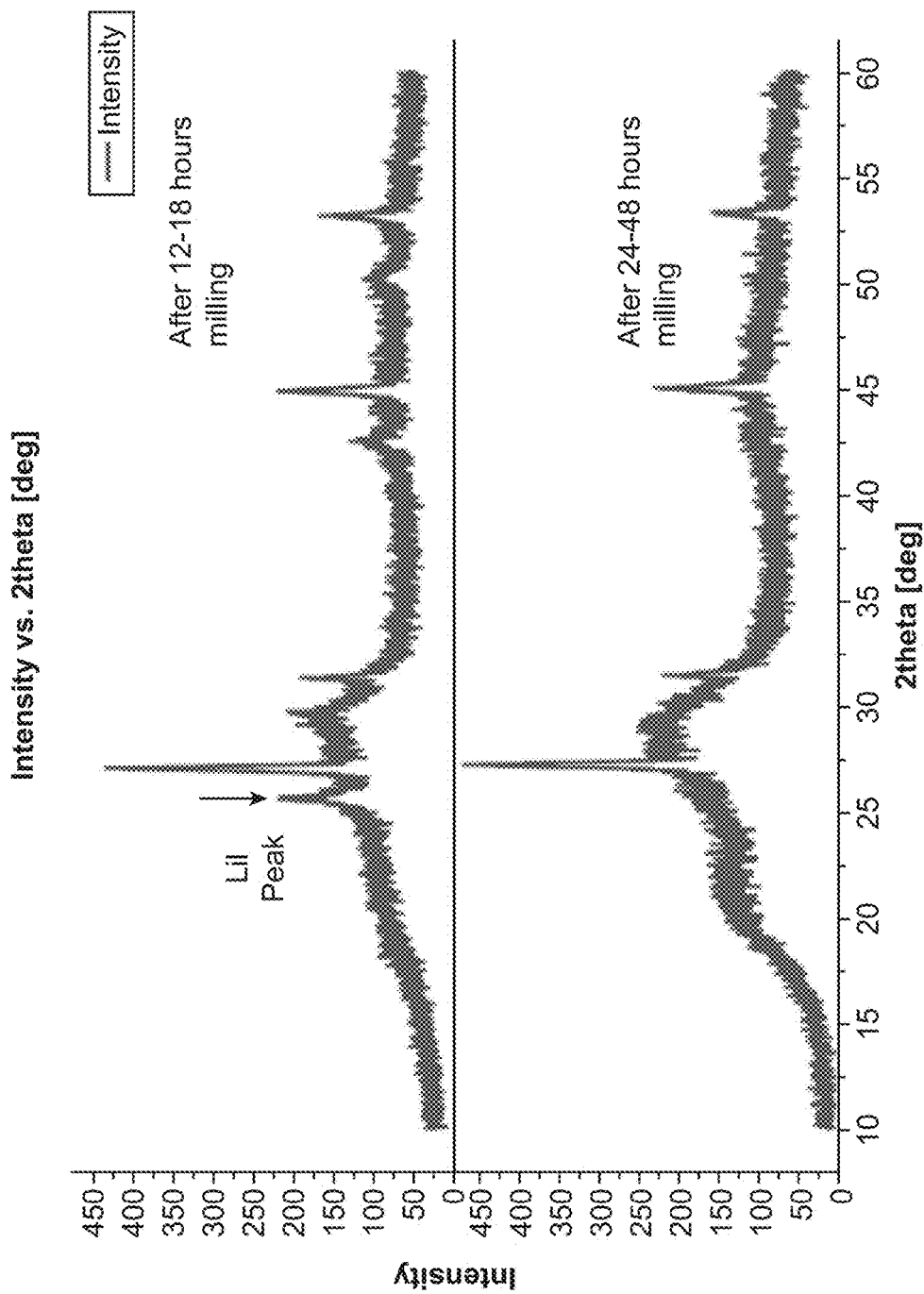
FIG. 2 shows an x-ray diffraction (XRD) pattern for LPSI pre-annealed precursors milled for two milling time periods.

To formulate the Lithium-Phosphorus-Sulfur-Iodine (LPSI) ion conductor, lithium sulfide ($Li_2S$), phosphorus pentasulfide ($P_2S_5$), and lithium iodide (LiI) were mixed in a predetermined ratio. In one sample, lithium sulfide ($Li_2S$), phosphorus pentasulfide ($P_2S_5$), and lithium iodide (LiI) were mixed in a (3-4):(0.1-1):(0.5-1.5) mole ratio in a 500 ml zirconia milling jar with 1 mm zirconia milling media at a milling media:powder mass ratio of >7.5. The mixture was agitated in a planetary mill (Retsch PM400, 150 mm revolution radius, 1:2 speed ratio) for sixteen to thirty-six 16-32 hours. As shown in FIG. 2, milling the precursors for about twelve (12) to eighteen (18) hours resulted in a precursor mixture in which crystalline lithium iodide (LiI) was observable. Also as shown in FIG. 2, milling the precursors for about twenty-four (24) to four-eight (48) hours resulted in a precursor mixture in which crystalline lithium iodide (LiI) was not observable.

The milling may densify the material for a given set of conditions in the absence of second phase. Also, the milling may increase the uniformity of Li and thereby Li transport and current density at the interface between the sulfide electrolyte and the lithium metal during operation. The milling may remove any measurable crystalline LiI domains prior to annealing and therefore a more homogeneous glassy end product is formed devoid of, for example, $Li_7P_2S_8I$ or $Li_6PS_5I$ phases.

The resulting powder mixture was separated from the media using an 80 mesh sieve (Retsch AS200), and annealed in a sealed stainless steel reactor (i.e., annealing reactor) with a boron nitride liner at either 170° C., 180° C., 190° C., 210° C., 230° C., 250° C., or 270° C., for 2-8 hours. The annealing conditions included an Argon atmosphere.

The annealing reactors and milling jars had air-tight seal. As a result, the powder annealing steps, as well as the powder milling steps, occur under the atmosphere in which the powder was loaded into the annealing reactor or milling jar. In this example, the powders were loaded into the annealing reactor and milling jar in an Argon-filled glove box.

Figure 3:
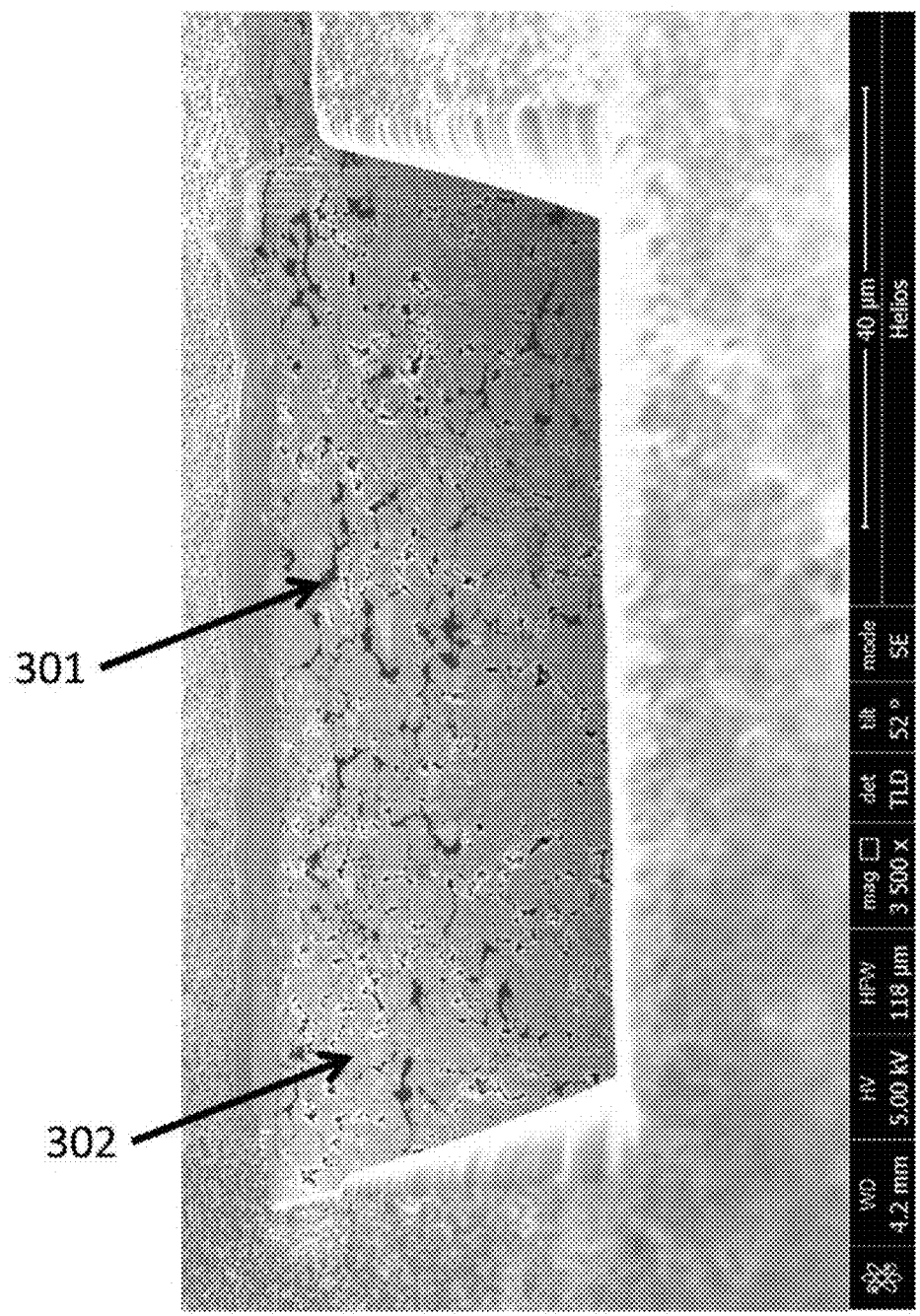
FIG. 3 shows a scanning electron microscopy (SEM) image of a composite of LPSI with a polymer prepared according to Example 2.

To create a sulfide-composite, a polymer (e.g. polypropylene, polyethylene, polybutadiene) is first cryo-milled in liquid nitrogen (SPEX) to form a fine powder. The polymer powder was then mixed with LPSI powder at 0.1-20 wt. % in a vortex mixer with two 10 mm zirconia grinding media for 12 hours. The polymer and the LPSI are then extruded together. A composite of a polymer, 301, and LPSI particles, 302, is shown in FIG. 3.

Example 2—Crystallinity of LPSI as a Function of the Annealing Temperature

The air-sensitive sulfide sample was loaded level into an air-tight Kapton film dome holder and measured with our Rigaku MiniFlex II X-ray Diffractometer. The diffractometer was set up with a 1.25 degree divergence and scattering slit, as well as a 0.3 mm receiving slit, with a graphite monochromator on our copper k-alpha x-ray tube. Samples were scanned from 10-60 degrees at 30 kV and 15 mA, with a sampling width of 0.020 degrees at a speed of 1.00 degrees/min.

Figure 4:
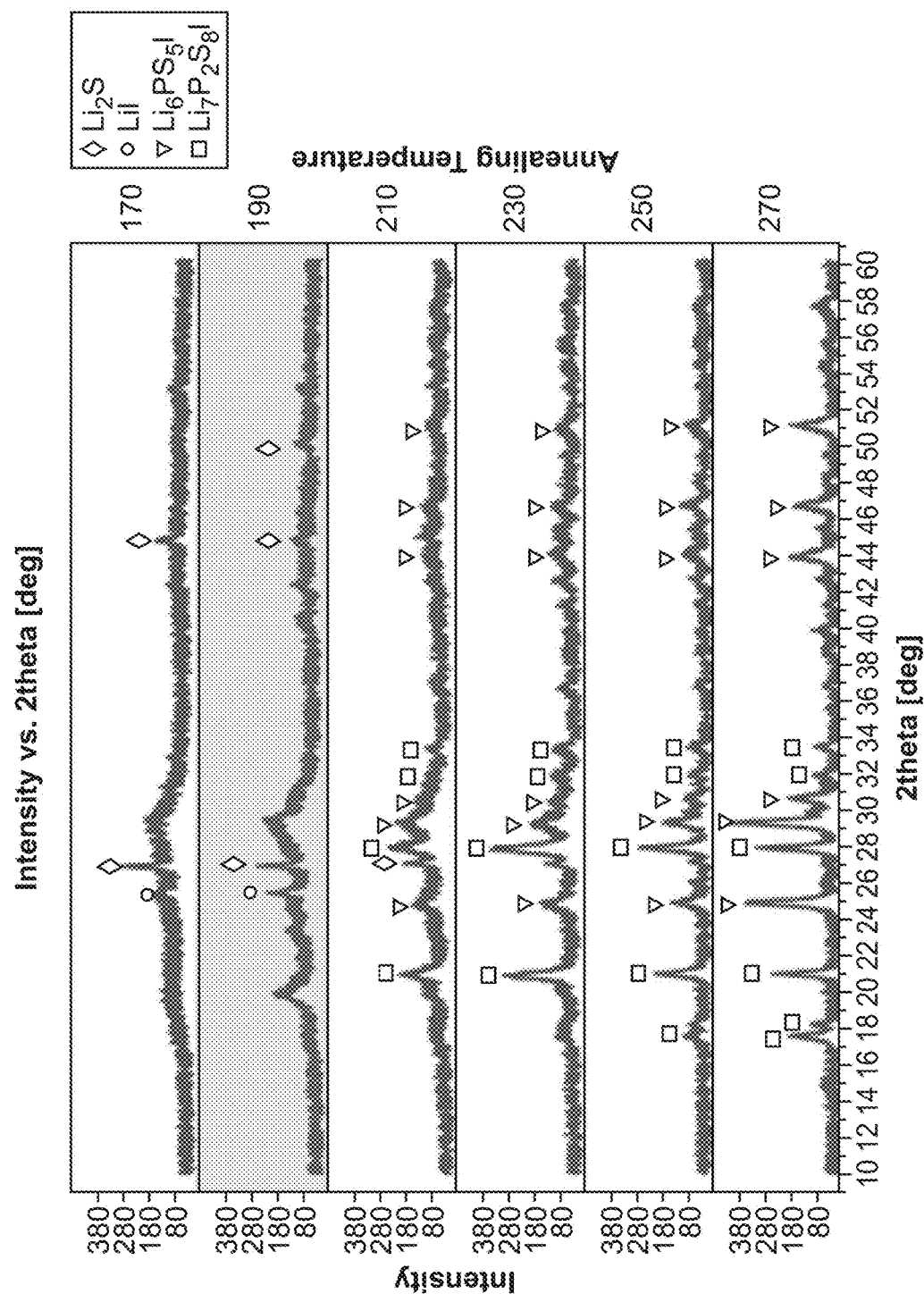
FIG. 4 shows XRD patterns of $Li_{7.4}P_{1.6}S_{7.2}I$ as a function of annealing temperature.

As shown in FIG. 4, each sample from Example 1 which was annealed at a different annealing temperature was observed to have a unique XRD pattern associated with it. As shown in FIG. 4, the LPSI material annealed at 190° C. was characterized by an x-ray powder diffraction (XRD) pattern having the following reflections at: 20, 25, 27, 29, and 45±1° (2Θ). As shown in FIG. 4, the LPSI material annealed at 170° C. is characterized by an x-ray powder diffraction (XRD) pattern which lacks reflections at: 20 and 29±1° (2Θ). As shown in FIG. 4, the LPSI material annealed at 210° C. or higher are characterized by x-ray powder diffraction (XRD) patterns having additional reflections at, for example, 21, 28, 33, 34 or 46±1° (2Θ).

At temperatures above 190° C., peaks arise at 21, 28, 34 degrees corresponding to the $Li_7P_2S_8I$ phase. Also, at temperatures above 190° C., peaks arise at 25, 29, 44, 47, and 51 degrees corresponding to the $Li_6PS_5I$ phase.

As shown in FIG. 4, the LPSI material annealed at 170° C. is characterized by an x-ray powder diffraction (XRD) pattern having primary peaks at 29 and 45±1° (2Θ). The peak at 20° (2Θ) which is present in the LPSI material annealed at 190° C. appears to diminish in intensity as the annealing temperature increases. Also the primary peaks for LPSI materials annealed above 190° C. are narrower (i.e., have a lower FWHM) than the primary peaks for LPSI materials annealed below 190° C.

When annealed at 190°, the FWHM of the broad peak at ~29° is ~3 degrees. When annealed at 210° C., the same peak at 29° possesses a FWHM of ~1°. This measurement was performed using a Rigaku diffractometer with 1.25° divergence and scattering slit, and a 0.3 mm receiving slit, with a graphite monochromator and a Cu Kα tube operating at 30 kV and 15 mA at 0.02° sampling width and 1°/min scan speed.

Figure 9:
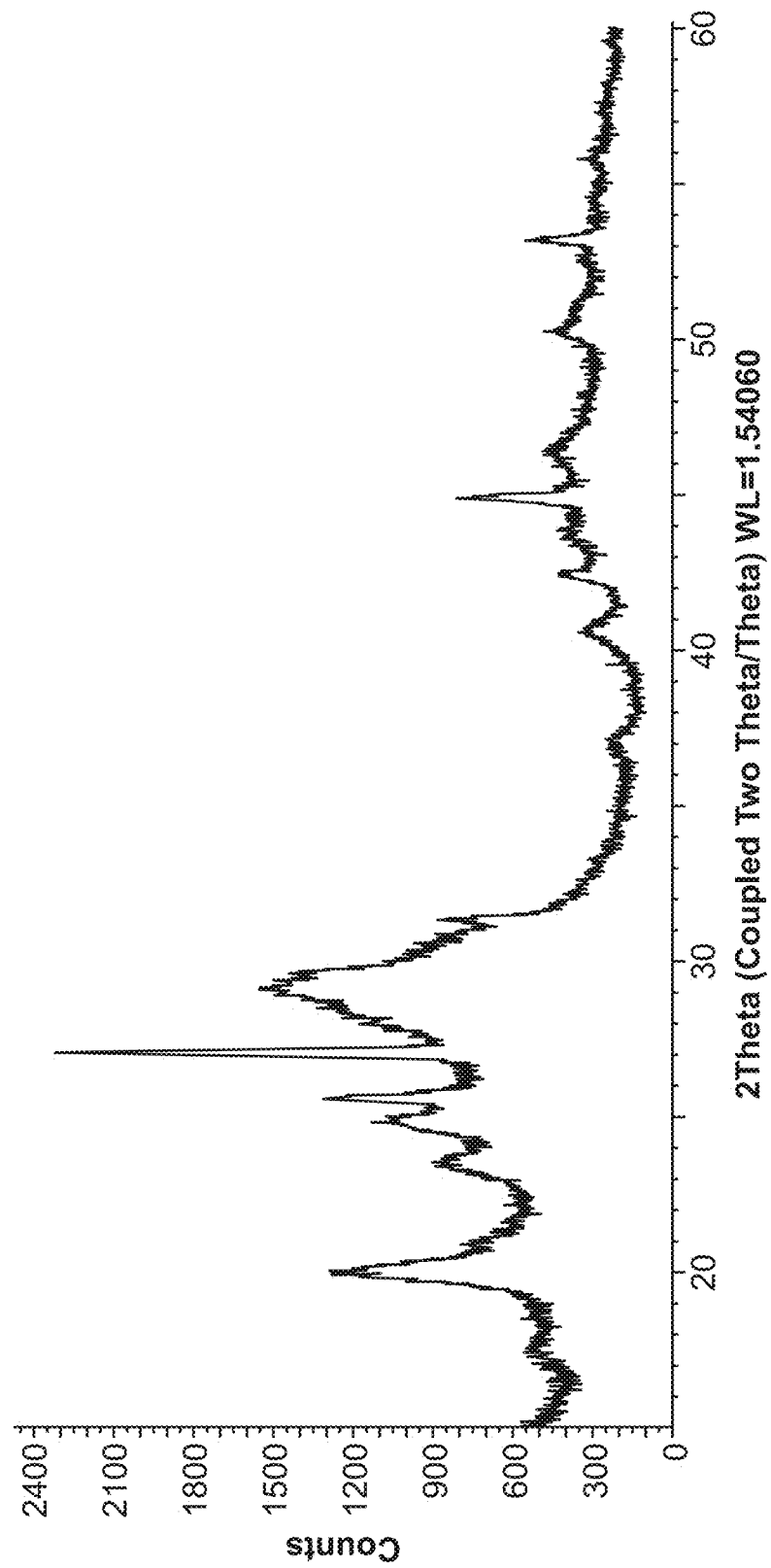
FIG. 9 shows a high resolution XRD powder pattern of $Li_{7.4}P_{1.6}S_{7.2}I$ annealed at 190° C.

A higher resolution scan of the LPSI sample annealed at 190° C. was taken on a Bruker diffractometer is shown in FIG. 9.

Example 3—Measuring Li Ion Conductivity in LPSI Annealed at Different Temperatures LPSI compositions were prepared according to Example 1 and annealed at either 170° C., 180° C., 190° C., 210° C., 230° C., 250° C., 270° C., for 2-8 hours. The annealing conditions included an Argon atmosphere.

Pellets of LPSI were prepared. Electrical impedance spectroscopy (EIS) was used to measure the impedance of the LPSI materials.

Figure 5:
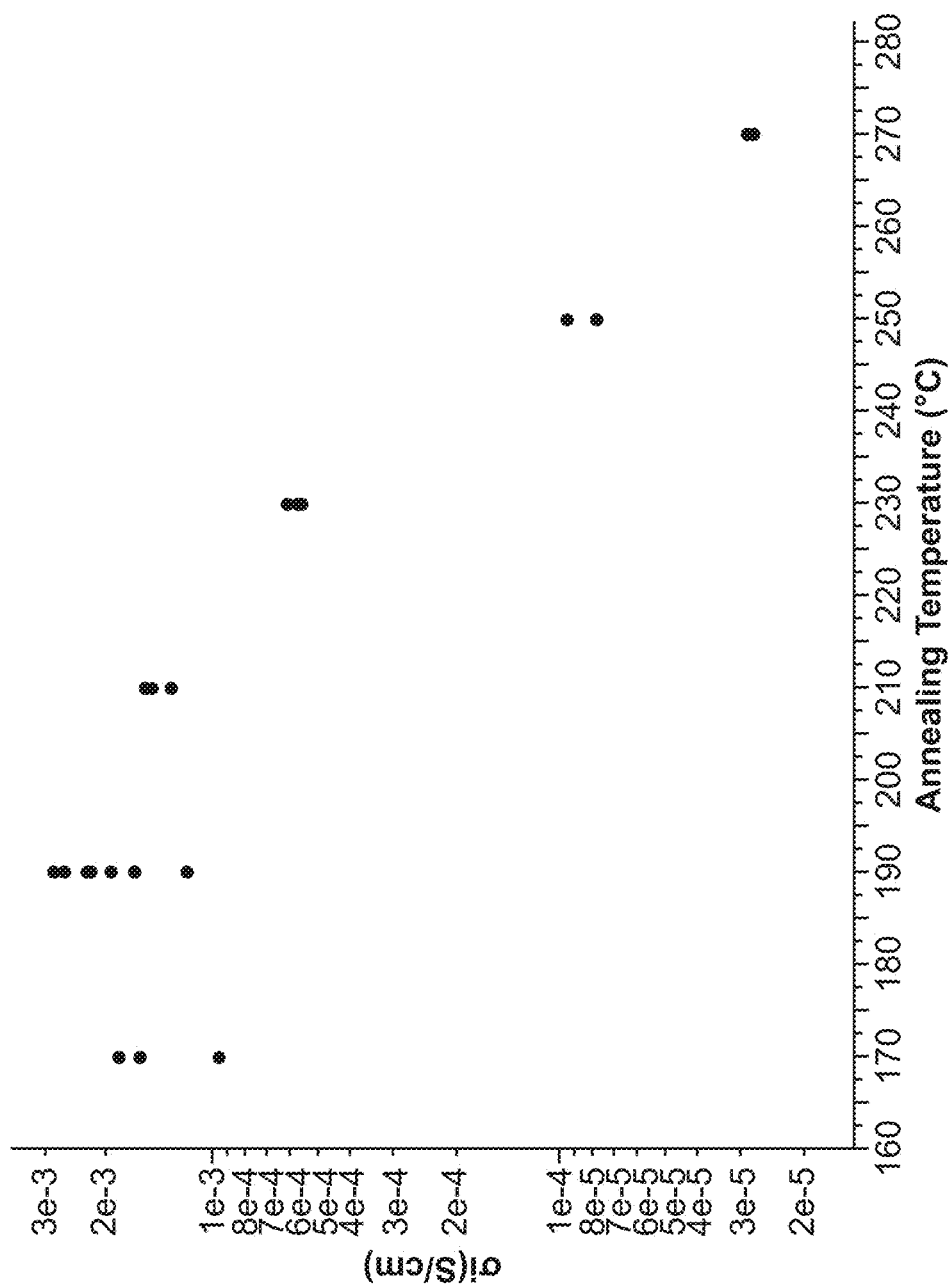
FIG. 5 shows conductivity measurements at 60° C. for pressed pellets of $Li_{7.4}P_{1.6}S_{7.2}I$ as a function of the temperature at which the $Li_{7.4}P_{1.6}S_{7.2}I$ was annealed.

As shown in FIG. 5, the conductivity of the LPSI materials is a function of the temperature at which the LPSI materials are annealed. As shown in FIG. 5, the highest conductivity was observed for the LPSI materials which were annealed at 190° C. LPSI materials annealed at 190° C. were observed to have a conductivity between $3-4\times10^{-3}$ S/cm. LPSI materials annealed at temperatures above or below 190° C. were observed to have a lower ionic conductivity than the LPSI materials annealed at 190° C.

Figure 6:
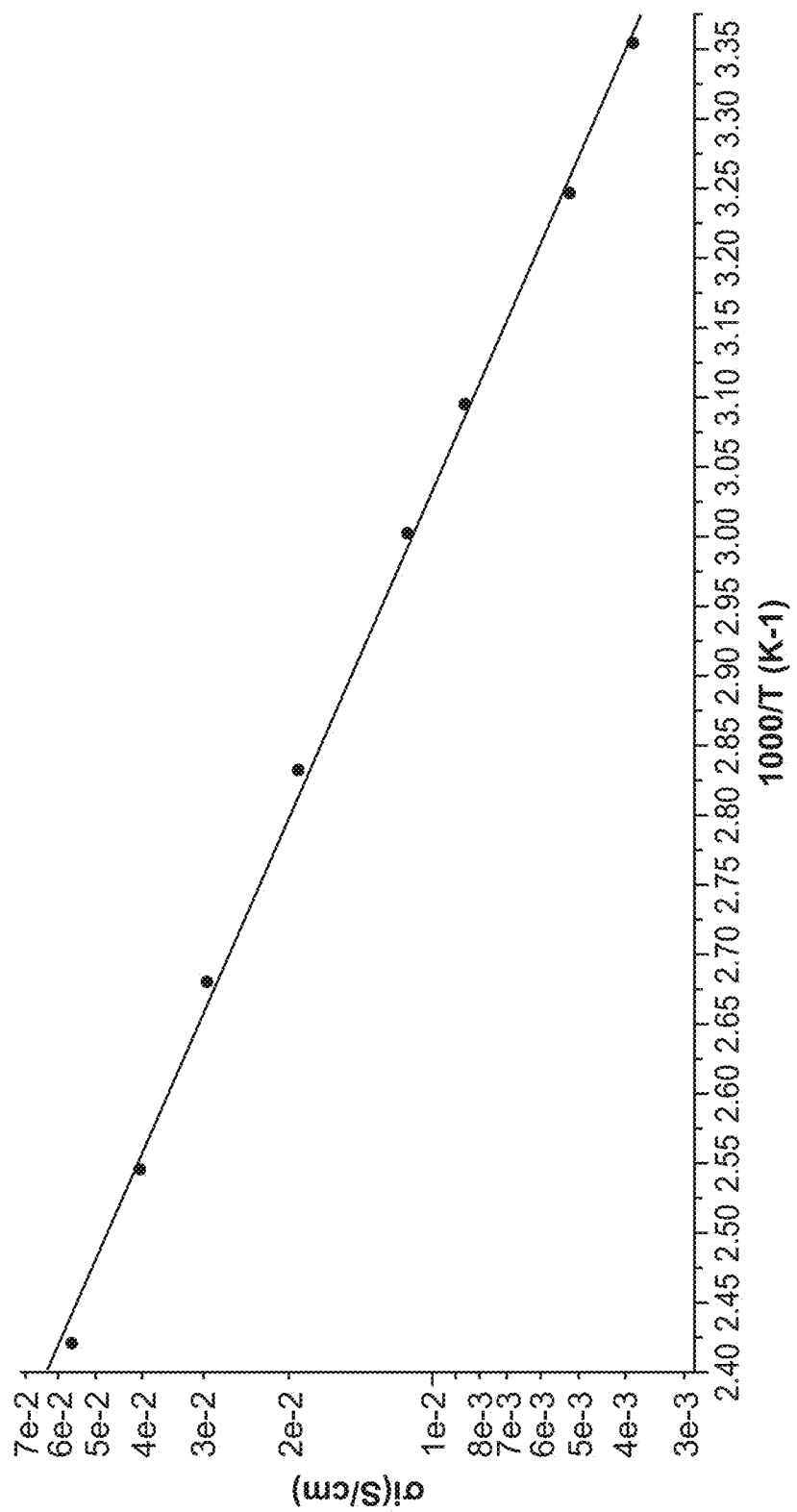
FIG. 6 shows an Arrhenius plot for a pressed pellet of $Li_{7.4}P_{1.6}S_{7.2}I$ prepared according to Example 1 and annealed at 190° C.

Example 4—Measuring Activation Energy of LPSI Annealed at Different Temperatures To evaluate ionic conductivity, 0.3 g of LPSI powder was pressed into a pellet using a uniaxial press, at 200° C., under 65,000 psi. Electrical contact was made by pressing Aluminum foil into the pellet. A potentiostatic electrochemical impedance spectroscopy measurement was performed using a BioLogic VSP potentiostat at open circuit, using a 25 mV amplitude signal from 1 MHz to 1 Hz at 30-120° C. The results are shown in FIG. 6.

Example 5—Method of Using LPSI Annealed at 190° C. in an Electrochemical Cell

The electrochemical cell was prepared by casting lithium zirconate (LZO) coated NMC particles with LSTPS, a binder, Ketjen black carbon, and C65 carbon onto a current collector. The NMC and LSTPS were present in a 3:1 to 6:1 mass ratio. The particle size distribution of the LSTPS was reduced prior to being mixed with the slurry by milling in dodecane/dodecyl sulfide until the LSTPS had a particle size of $d_{50} \leq 10$ µm. After the slurry was dried on a current collector, which formed a film, a layer of LPSI was laminated to the dried film. The resulting film was pressed at about 100-300 kPSI at 100-400° C. A 12 mm disc of this pressed material was punched. Two (2) µm of Li were evaporated onto the 12 mm disc, onto the LPSI material, through a 10 mm mask which had a Teflon insulator.

Figure 7:
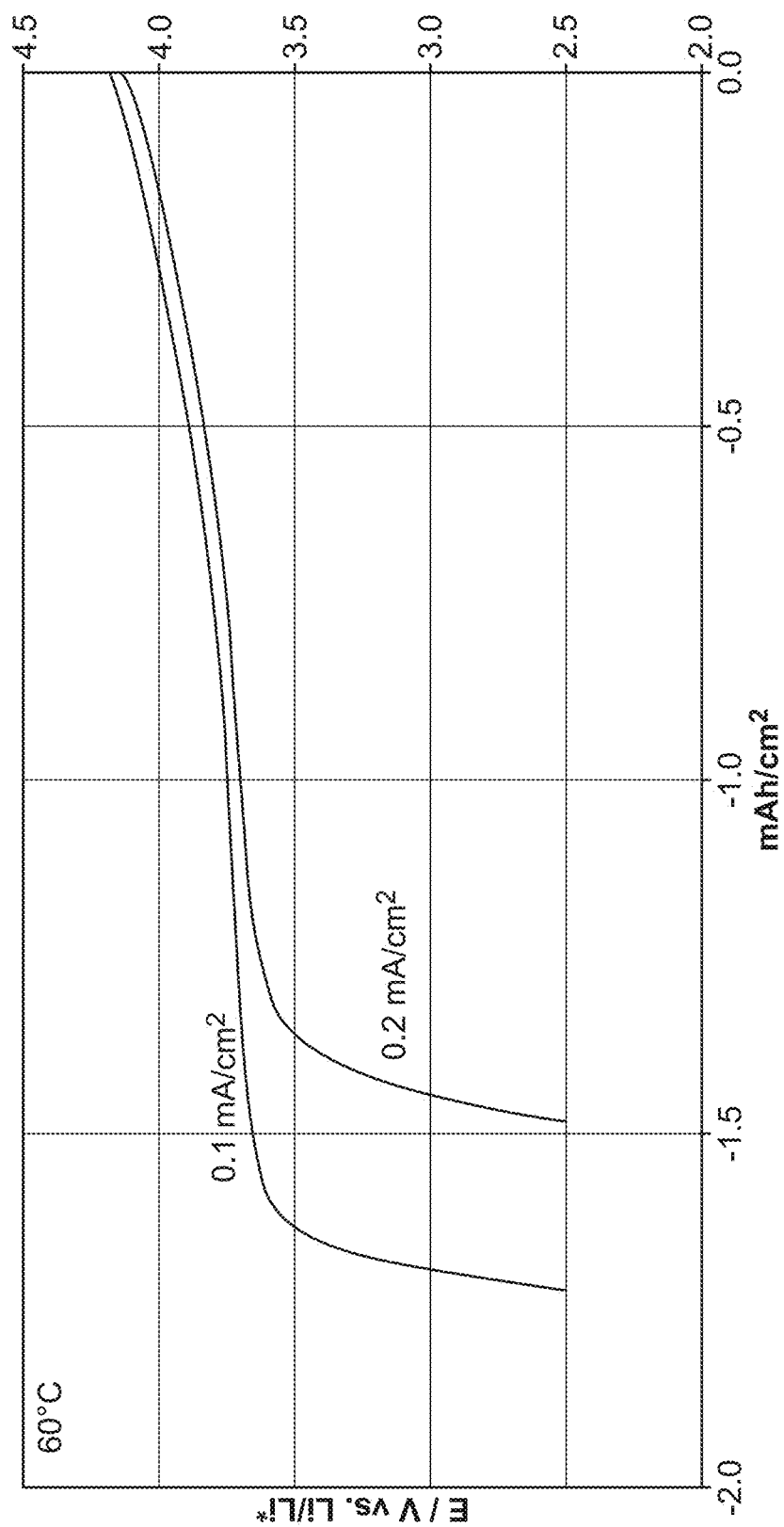
FIG. 7 shows a discharge plot as a function of a two (2) different discharge rates for an electrochemical cell having an electrolyte membrane therein which consists of a pressed pellet of $Li_{7.4}P_{1.6}S_{7.2}I$ prepared according to Example 1 and annealed at 190° C.

Then, as shown in FIG. 7, the electrochemical cell was discharged at 0.1 mA/cm$^2$ and 0.2 mA/cm$^2$ from 4.2 V at 60° C. The electrochemical cell was stacked substantially as set forth in FIG. 1.

Figure 10:
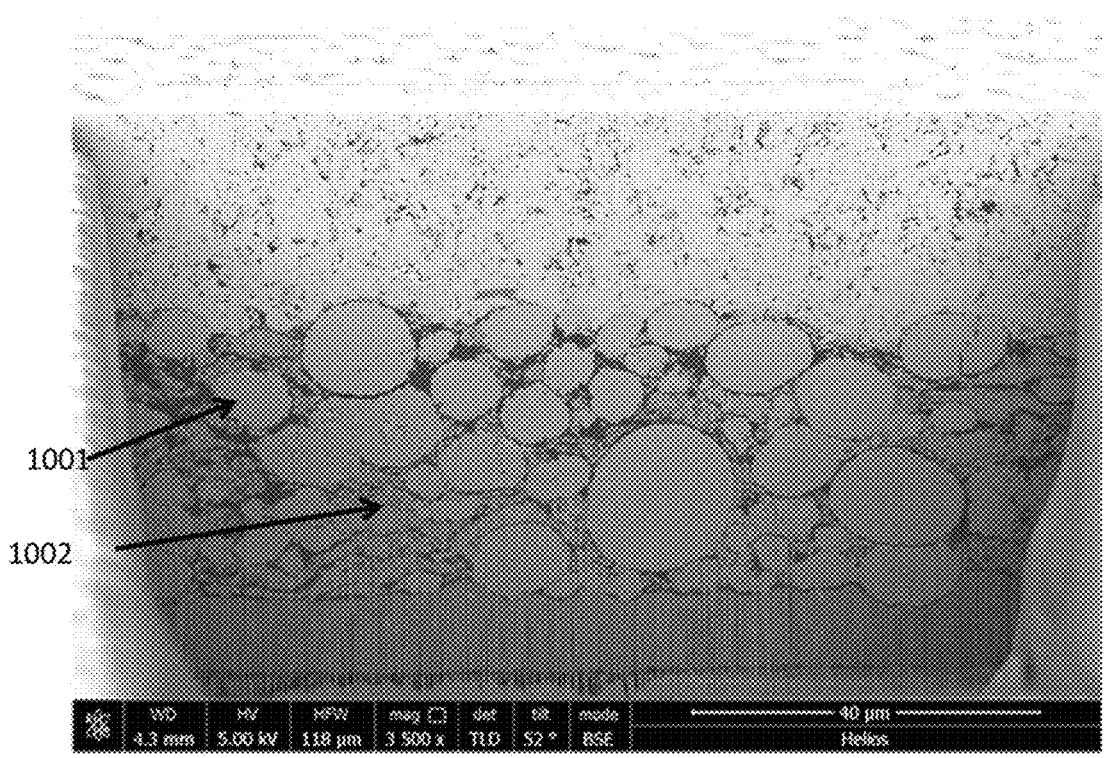
FIG. 10 shows a SEM image of a cathode in an electrochemical cell in which a milled solid-state sulfide-based catholyte is mixed with carbon and a cathode active material and the cell includes a sulfide electrolyte separator.

The electrochemical cell is shown in FIG. 10 as a cross-sectional SEM image. As shown in FIG. 10, the cathode includes NMC particles 1001 which are surrounded by LSTPS catholyte 1002.

Figure 14:
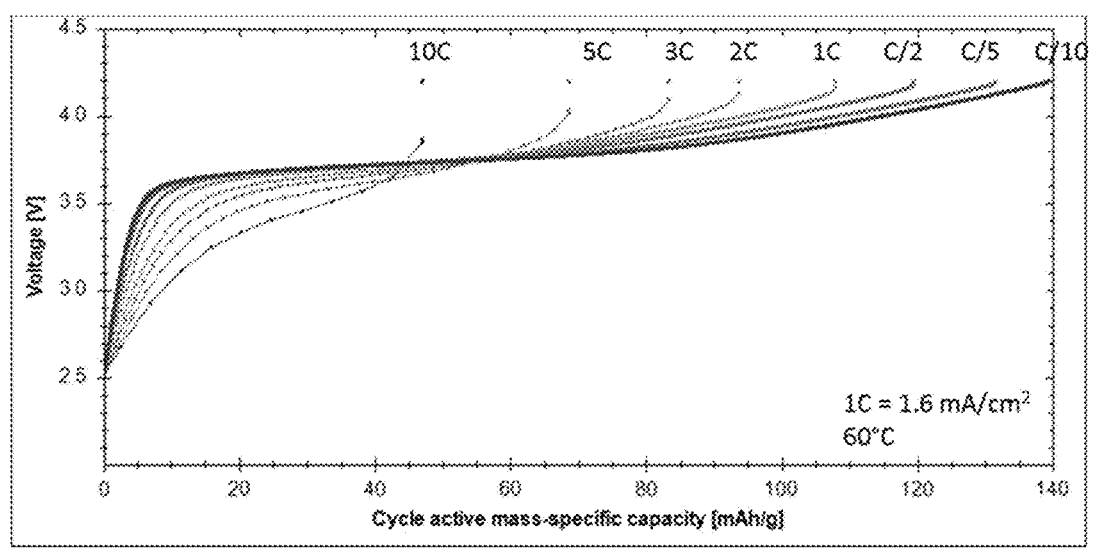
FIG. 14 shows a discharge plot as a function of two (2) different discharge rates for an electrochemical cell having an electrolyte membrane therein which consists of a pressed pellet of $Li_{7.4}P_1$.

In another electrochemical test, the electrochemical cell was discharged at various rates from C/10 to 10 C (where 1 C=1.6 mA/cm2) from 4.2 V at 60° C. The electrochemical cell was stacked substantially as set forth in FIG. 1. The results are presented herein in FIG. 14.

Example 6—Comparison of LPSI Annealed at 190° C. with Known Sulfide-Electrolytes Reported here are LPSI formulations annealed at 190° C. having an ionic conductivity of 4e-3 S/cm. Rangasamy et al., for example, (J. Am. Chem. Soc. DOI: 10.1021/ja508723m), reported a Li$_7$P$_2$S$_8$I composition annealed at 200° C. with a room temperature conductivity of 6.3e-4 S/cm. Thus, the instant composition was more than an order of magnitude more ionically conductive than a closely related sulfide.

Ujiie et al., for example, (DOI: 10.1007/s10008-012-1900-7), reported a range of compositions described by the formula, (100-x)(0.8Li$_2$S*0.2P$_2$S$_5$)xLiI (x=0, 2, 5, 10, 15, 20) which were annealed from 200-300° C. These compositions of Ujiie, et al, were reported to have a maximum room temperature conductivity of 2.7e-3 S/cm for x=5. The LPSI formulations annealed at 190° C. reported herein have a surprisingly high ionic conductivity in comparison to these references.

Ujiie et al. (DOI: 10.1016/j.ssi.2012.01.017) also reported a range of compositions described by the formula (100-x) (0.7Li2S*0.3P$_2$S$_5$)xLiI (x=0, 1, 3, 5, 9, 20). These compositions were annealed from 220-270° C. and were observed to have an ionic conductivity of 4e-3 S/cm at x=0 for the annealed glass-ceramic but less than 2e-5S/cm for glass ceramics with x>3, and a maximum conductivity of 5.6e-4 S/cm at x=20 for the unannealed glass.

Example 7—DSC Measurement and Analysis of Li$_{7.4}$P$_{1.6}$S$_{7.2}$I

To formulate the Lithium-Phosphorus-Sulfur-Iodine (LPSI) ion conductor, lithium sulfide (Li$_2$S), phosphorus pentasulfide (P$_2$S$_5$), and lithium iodide (LiI) were mixed in a predetermined ratio. In one sample, lithium sulfide (Li$_2$S), phosphorus pentasulfide (P$_2$S$_5$), and lithium iodide (LiI) were mixed in a 3.2:0.8:1 molar ratio in a 500 ml zirconia milling jar with 1 mm zirconia milling media at a milling media:powder mass ratio of >7.5. The mixture was agitated in a planetary mill (Retsch PM400, 150 mm revolution radius, 1:-2 speed ratio) for sixteen to thirty-six 16-32 hours.

Figure 8:
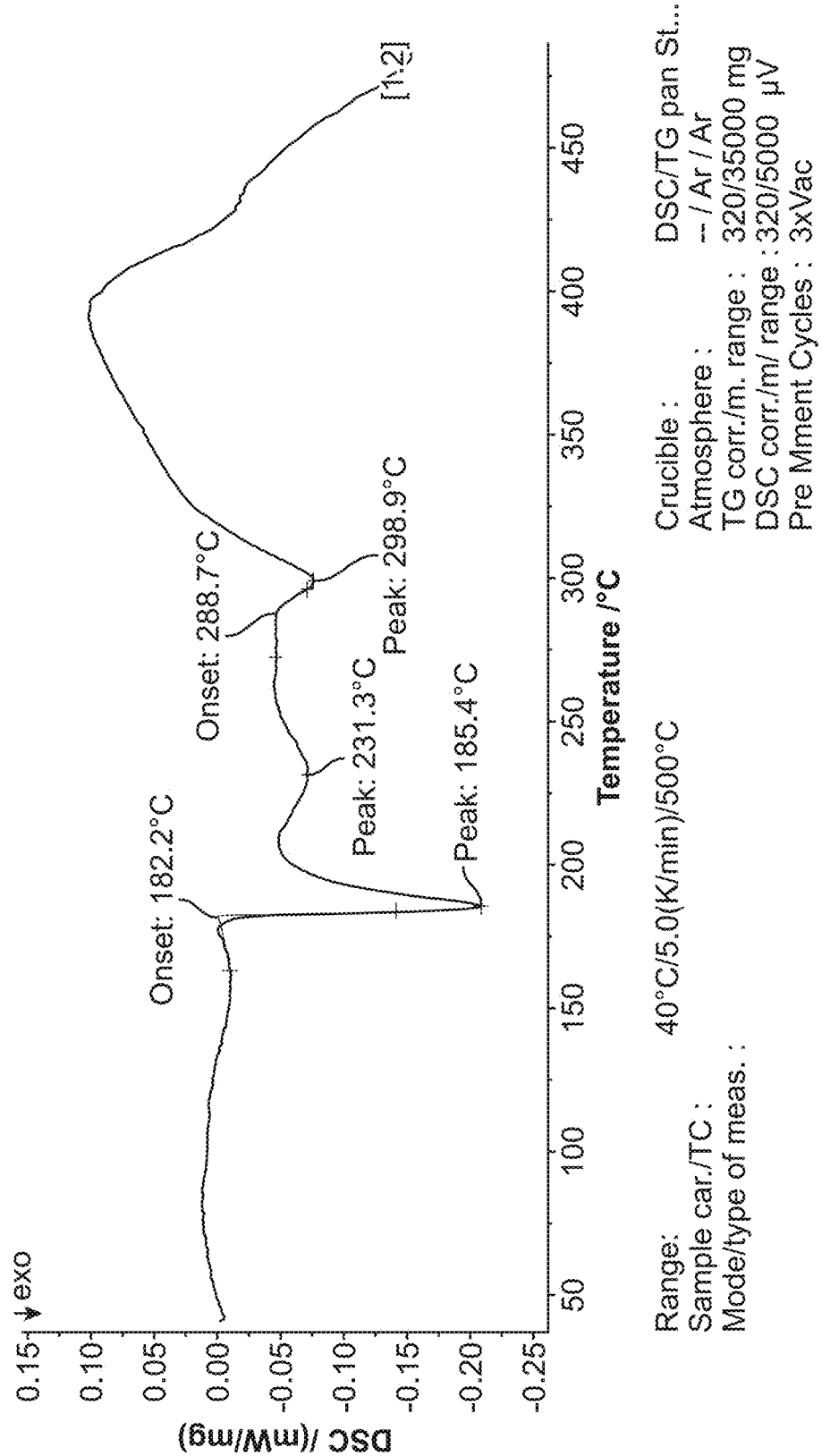
FIG. 8 shows a dynamic scanning calorimeter (DSC) measurement of a pressed pellet of $Li_{7.4}P_{1.6}S_{7.2}I$ prepared according to Example 7.

10 mg of powder is loaded into a crucible for the DSC measurement of Li$_{7.4}$P$_{1.6}$S$_{7.2}$I on a DSC calorimeter. As shown in FIG. 8, an exotherm was observed around 180-190° C. This exotherm corresponds to a crystallization event for LPSI. The 190° C. annealed LPSI samples herein were thus annealed at a temperature close to or approximating the temperature for this crystallization event for LPSI but for annealing time periods which do not allow the entirety of the LPSI to crystallize.

Example 8—Method of Making a Bi-Layer Solid State Electrolyte Membrane Having Lithium-Phosphorus-Sulfur-Iodine ("LPSI") on One Side and Silicon-Lithium-Sulfur ("LSS") on the Other Side To create the bi-layer separator, LPSI powder from Example 1 and annealed at 190° C. was first added to a mold, followed by the application of greater than 10,000 psi pressure. To one side of the resulting condensed pellet of LPSI, LSS powder was added in a 3:1-1:1 LPSI:LSS ratio, followed by heating to 150-250° and the application of greater than 10,000 psi pressure for 5 minutes. The bi-layer separator was allowed to cool and removed as a freestanding film or pellet. Additional details are as follows.

An LPSI membrane was prepared according to Example 1 and annealed at 190° C.

A LSS membrane was prepared by weighing and combining the following powder reagents, Li$_2$S, and SiS$_2$ according to the desired formula (50:50 to 70:30 Li$_2$S:SiS$_2$) in this example. The powder mixture was milled by adding to a zirconia milling pot of appropriate size with zirconia milling media (~1-10 mm in diameter milling media). The pot was sealed from atmospheric exposure and placed on a planetary mill for 16-32 hours.

Electrolyte separators were made in a pellet form factor by adding the LSS material to a cold pressed LPSI layer in a 2:1 LPSI:LSS ratio, followed by compaction of greater than 10,000 psi at 180-210° C.

A bi-layer membrane having LSS on one side and LPSI on the other side resulted from this hot pressing at 180-210° C. and 100,000 psi for approximately five (5) minutes. Lithium metal was evaporated onto the LPSI side to form the negative electrode (i.e., anode). A swollen PvDF gel containing 3:7 volume ratio of ethylene carbonate (EC) to ethyl methyl carbonate (EMC) EC:EMC w/LiPF$_6$ electrolyte was cast against the LSS side. On top of this gel was placed a PVDF gel including cathode which also included LiNi$_{0.6}$Mn$_{0.2}$Co$_{0.2}$O$_2$ and 3:7 v/v EC:EMC w/1.0 M LiPF$_6$ electrolyte. The stack was then placed into a CR2032 coin cell for electrochemical testing.

Example 9—Characterization of Electrochemical Cell Having the Bi-Layer Membrane of Example 8

An electrochemical stack was prepared as illustrated in Example 8. The stack included a 2 µm thick anode of Li metal which was disc-shaped and approximately 10 mm in disc diameter. Layered on top of the Li metal was the bi-layer membrane of Example 8 which included a disc-shaped LPSI layer that was approximately 12.7 mm in diameter and a disc-shaped LSS layer that was approximately 12.7 mm in diameter. The bilayer was approximately 400-800 μm thick. On top of the electrolyte membrane was a gel electrolyte, which was approximately 8 mm in diameter and included 1M $LiPF_6$ in EC:EMC with 80:20 volume ratio of polymer PvDF:HFP to solvent EC:EMC. Lastly, the stack included a 10 mm diameter disc of cathode active materials which included ~91 wt. % NMC, $LiNi_{0.6}Mn_{0.2}Co_{0.2}O_2$ cathode active particles in an 1M $LiPF_6$ in EC:EMC gel, as described in Example 8.

A second electrochemical stack was prepared as illustrated in Example 8 except that the LPSI membrane from Example 1 was used in place of the bi-layer membrane. The stack included a disc shaped, 10 mm in diameter, anode of Li metal. Layered on top of the Li metal was the LPSI membrane of Example 1 which was approximately 400-800 μm thick and 12.7 mm in diameter. On top of the electrolyte membrane was a gel electrolyte, which was approximately 8 mm in diameter, and included 1M $LiPF_6$ in EC:EMC with 80:20 HPDF:HFP. Lastly, the stack included a 10 mm diameter disc of cathode active materials which included ~91 wt. % NMC, $LiNi_{0.6}Mn_{0.2}Co_{0.2}O_2$ cathode active particles in an 1M $LiPF_6$ in EC:EMC gel, as described in Example 8.

The electrochemical stacks were cycled at 45° C. at 4 mAh/cm$^2$ in a GITT charge/discharge set-up. The tests included C/10 pulse rate for a 4 mAh/cm$^2$ cathode (0.4 mA/cm$^2$) for 30 minutes, followed by a 10 minute rest, where the GITT test had voltage limits of 2.8-4.6 V vs. Li.

Figure 12:
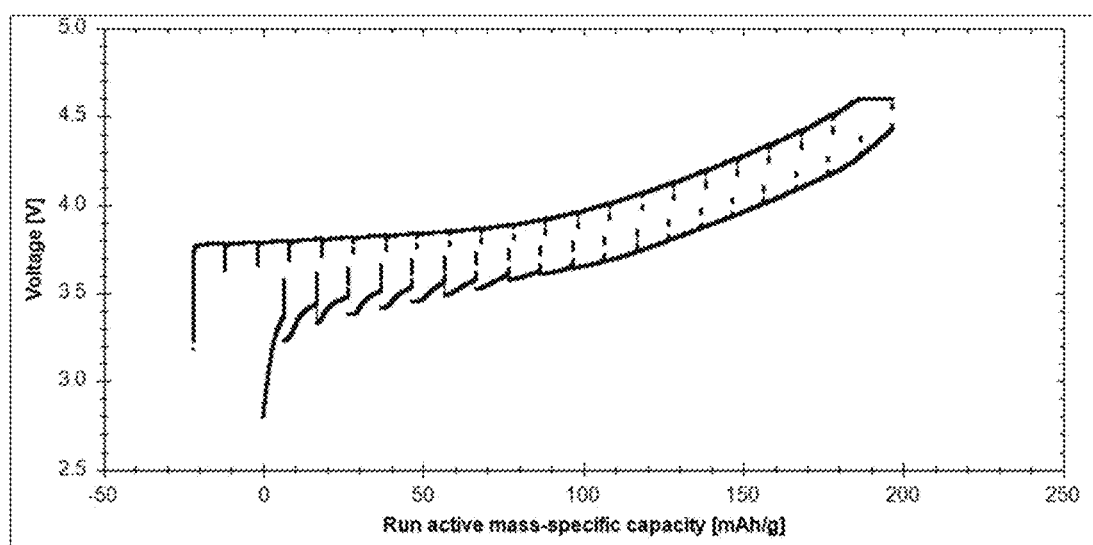
FIG. 12 shows an electrochemical cycle plot of Voltage as a function of run active mass-specific capacity for an electrochemical cell having a double-layer solid-state electrolyte membrane having one layer of LPSI interfacing a lithium metal anode and one layer of LSS interfacing a gel-electrolyte containing cathode.

As shown in FIG. 12, the electrochemical stack having the bi-layer membrane was stable against degradation or dendrite formation over the electrochemical cycle. The electrochemical voltage response reflects intercalation reaction for NMC. A capacity of ~200 mAh/g is achieved.

Figure 13:
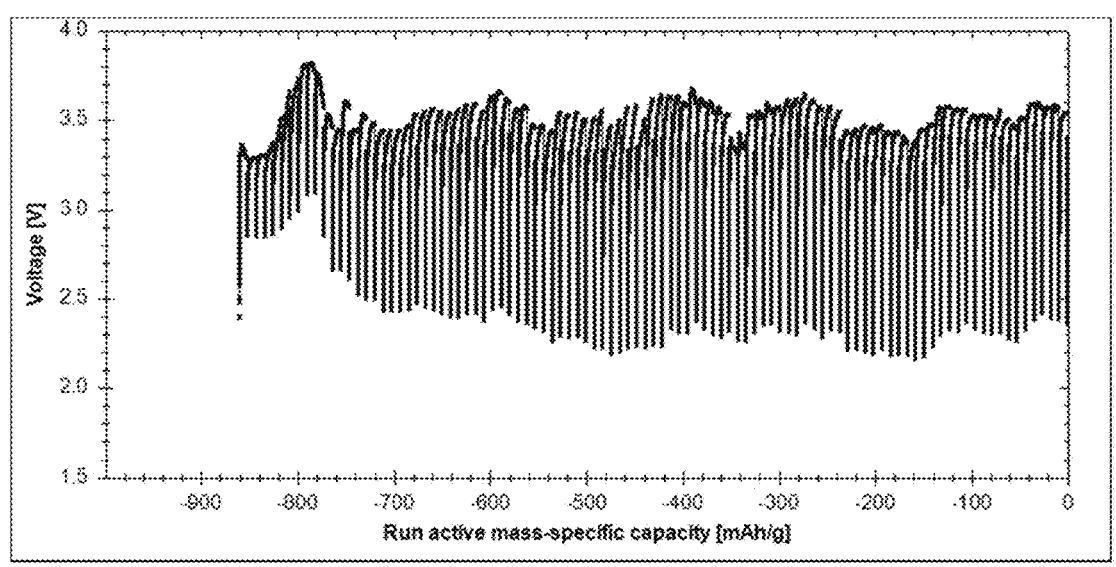
FIG. 13 shows an electrochemical cycle plot of Voltage as a function of run active mass-specific capacity for an electrochemical cell having a single-sided solid-state electrolyte membrane having one layer of LPSI between a lithium metal anode and a gel-electrolyte containing cathode.

The electrochemical stacks were cycled at 50° C. at 1.5 mAh/cm$^2$ in a GITT charge/discharge set-up. The tests included C/10 pulse rate for a 1.5 mAh/cm$^2$ cathode (0.15 mA/cm$^2$) for 40 minutes, followed by a 10 minute rest. The electrochemical voltage response was not stable above 3.6 V. The voltage was instead pinned to lower voltages characteristic of sulfide or iodide oxidation (2.0-3.0 V). Therefore, in contrast to the results presented in FIG. 12, and as shown in FIG. 13, the electrochemical stack having the LPSI membrane was not as stable over the electrochemical cycle. FIG. 12 demonstrates that the bi-layer membrane of Example 8 is suitable for use in a solid state electrochemical stack and cycled with a lithium metal anode without shorting or otherwise demonstrating detrimental electrochemical performance.

Example 10—Characterization of Electrochemical Cell Having an LPSI Membrane Prepared According to Example 1 and Annealed at 190° C.

Figure 17:
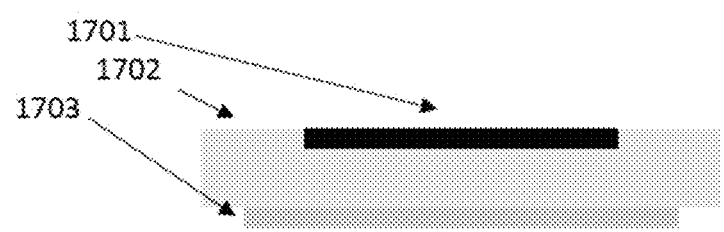
FIG. 17 shows an illustration of the electrochemical stack used in the electrochemical cell tested in Example 10.

An electrochemical cell was prepared having an electrochemical stack as illustrated in FIG. 17. In the electrochemical stack illustrated in FIG. 17, there was a 10 mm diameter Li metal anode, 1703, which was evaporated to one side of a monolith of LPSI ($Li_{7.4}P_{1.6}S_{7.2}I$) which was prepared according to Example 1, 1702, and annealed at 190° C. The LPSI monolith was 12.7 mm in diameter. Pressed into the top of the LPSI monolith was an 8 mm diameter cathode, 1701.

The electrochemical cell was charged and discharged for 53 cycles at C/10 (0.39 mA/cm$^2$) charge current density and C/3 (1.3 mA/cm$^2$) discharge current density (relative to cathode size) in a GITT charge/discharge set-up between 2.7-4.2V vs Li. The test was conducted at 45° C., in which 22 μm of Li metal was passed per cycle.

Figure 15:
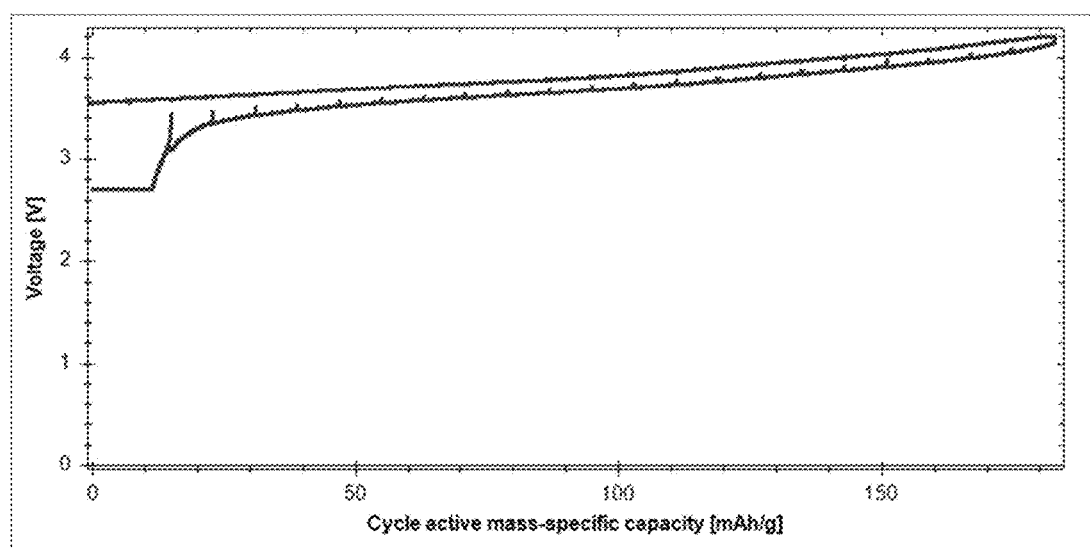
FIG. 15 shows an electrochemical cycle plot of Voltage as a function of active mass-specific capacity for an electrochemical cell having a $Li_{7.4}P_{1.6}S_{7.2}I$ separator prepared according to Example 1 and annealed at 190° C. and tested according to Example 10.
Figure 16:
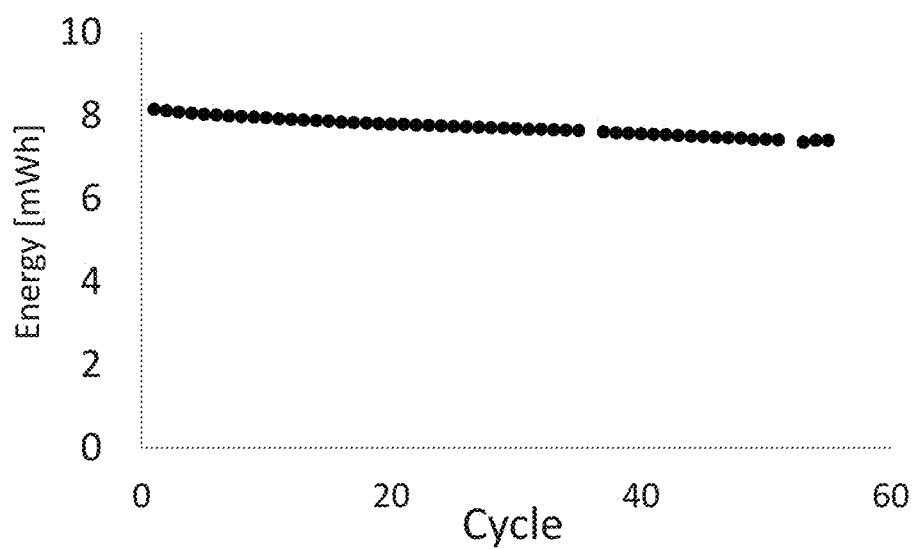
FIG. 16 shows a plot of Energy (mWh) as a function of charge-discharge cycle for the electrochemical cell tested in Example 10.

The results of this test are shown in FIG. 15 (voltage versus active mass-specific capacity for the first cycle) and FIG. 16 (discharge energy per cycle vs cycle number).

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed:

1. An electrolyte comprising a compound characterized by $Li_xP_yS_zI_t$, wherein $5 \leq x \leq 12$; $1 \leq y \leq 3$; $5 \leq z \leq 9$, and $0.1 \leq t \leq 2$; and
   characterized by an x-ray powder diffraction (XRD) pattern having a primary peak at $27 \pm 1°$ (2Θ); and
   characterized by an x-ray powder diffraction (XRD) pattern having at least one of the following reflections at: 20, 25, 29, or $45 \pm 1°$ (2Θ);
   wherein subscripts x, y, z, and t are rational numbers;
   wherein the compound is neutrally charged.

2. The electrolyte of claim 1, consisting essentially of $Li_xP_yS_zI_t$, wherein $5 \leq x \leq 12$; $1 \leq y \leq 3$; $5 \leq z \leq 9$, and $0.1 \leq t \leq 2$; and
   characterized by an x-ray powder diffraction (XRD) pattern having a primary peak at $27 \pm 1°$ (2Θ); and
   characterized by an XRD pattern having at least one of the following reflections at: 20, 25, 29, or $45 \pm 1°$ (2Θ);
   wherein subscripts x, y, z, and t are rational numbers;
   wherein the compound is neutrally charged.

3. The electrolyte of claim 1, wherein the compound is characterized by an XRD pattern having the following reflections at 20, 25, 27, 29, and $45 \pm 1°$ (2Θ).

4. The electrolyte of claim 1, wherein the compound is characterized by an XRD pattern having the following reflections at 20, 25, 27, 29, and $45 \pm 1°$ (2Θ).

5. The electrolyte of claim 1, wherein the compound is semiamorphous.

6. The electrolyte of claim 1, wherein the compound is not:
   a member selected from the group consisting of ($Li_3PS_4$) 3(LiI), ($Li_3PS_4$)2(LiI), ($Li_3PS_4$)(LiI), 2($Li_3PS_4$)(LiI), 3($Li_3PS_4$)(LiI), and combinations thereof;
   a member selected from the group consisting of $Li_7P_2S_8I$, $Li_6PS_5F$, $Li_6PS_5Cl$, $Li_6PS_5Br$, $Li_6PS_5I$, and combinations thereof;
   a member selected from the group consisting of 80(70$L_2$S.30$P_2S_5$)20(LiI), 70(70$L_2$S.30$P_2S_5$)30(LiI), and combinations thereof;
   a member selected from the group consisting of a solid solution of $L_3PS_4$, LiI, $Li_2S$, $P_2S_5$, and combinations thereof;

(100-X)(80L$_2$S.20P$_2$S$_5$)X(LiI), wherein X is 0, 2, 5, 10, 15, 20 or 30; or a mixture of Li$_2$S, P$_2$S$_5$, LiF, LiCl, LiBr, and/or LiI or combinations thereof.

7. The electrolyte of claim 1, wherein the compound is not Li$_7$P$_2$S$_8$I or Li$_6$PS$_5$I.

8. The electrolyte of claim 1, wherein the compound does not have an argyrodite crystal structure.

9. The electrolyte of claim 1, wherein the compound does not comprise germanium (Ge) or any germanium species.

10. The electrolyte of claim 1, wherein the compound does not comprise arsenic (As) or any arsenic species.

11. The electrolyte of claim 1, wherein the compound is Li$_{7.4}$P$_{1.6}$S$_{7.2}$I.

12. The electrolyte of claim 1, wherein the compound is Li$_a$P$_b$S$_c$I$_d$, wherein a is from 7.2 to 7.6, b is from 1.4 to 1.8, c is from 7.0 to 7.4, and d is from 0.8 to 1.2, and wherein the electrolyte is charge neutral.

13. The electrolyte of claim 1, wherein the compound is Li$_{7.4}$P$_{1.6}$S$_{7.2}$I wherein the subscript values may vary by ±5%.

14. The electrolyte of claim 1, wherein the compound is Li$_7$P$_2$S$_8$I wherein the subscript values may vary by ±5%.

15. The electrolyte of claim 2, wherein the compound is Li$_7$P$_2$S$_8$I wherein the subscript values may vary by ±5%.

16. The electrolyte of claim 1 further comprising a polymer.

17. The electrolyte of claim 16, wherein the weight loading of Li$_x$P$_y$S$_z$I$_t$ in the electrolyte further comprising a polymer is at least 50% (w/w) but less than 95% (w/w).

18. The electrolyte of claim 17, wherein the volume loading of Li$_x$P$_y$S$_z$I$_t$ in the electrolyte further comprising a polymer is at least 50% (v/v).

19. The electrolyte of claim 17, wherein the volume loading of Li$_x$P$_y$S$_z$I$_t$ in the electrolyte further comprising a polymer is at least 70% (v/v).

20. The electrolyte of claim 17, wherein the volume loading of Li$_x$P$_y$S$_z$I$_t$ in the electrolyte further comprising a polymer is between 70%-85% (v/v).

21. The electrolyte of claim 17, wherein the volume loading of Li$_x$P$_y$S$_z$I$_t$ in the electrolyte further comprising a polymer is between 75%-85% (v/v).

22. The electrolyte of claim 16, wherein the polymer comprises at least one member of the group consisting of epoxies, epoxides, polypropylene (PP), atactic polypropylene (aPP), isotactic polypropylene (iPP), polybutyl diene, polybutadiene (PBD), polybutadiene rubber (PB), cross-linked polybutadiene (cPBD), polystyrene (PS), ethylene propylene rubber (EPR), ethylene pentene copolymer (EPC), polyisobutylene (PM), styrene butadiene rubber (SBR), polyolefins, polyethylene-co-poly-1-octene (PE-co-PO), PE-co-poly(methylene cyclopentane) (PE-co-PMCP), poly methyl-methacrylate, acrylics, acrylonitrile-butadiene rubber (NBR), polyvinyl acetacetal resin, polyvinylbutylal resin, PVB stereoblock polypropylenes, polypropylene polymethylpentene copolymer, polyethylene oxide (PEO), PEO block copolymers, nitriles, nitrile butadiene rubber, carboxymethyl cellulose (CMC), polyisoprene rubber (PI), polychloroprene rubber (CR), polyethyl acrylate (PEA), polyvinylidene fluoride (PVDF), aqueous-compatible polymers, silicone, PMX-200 (polydimethylsiloxane, PDMS), methyl methacrylate, ethyl methacrylate, polyvinylbutyral (PVB), poly ethyl methacrylate (PEMA), polyvinyl pyrrolidone (PVP), stereo block polypropylenes, polypropylene polymethylpentene copolymer, polypropylene carbonate, polyethylene, and combinations thereof.

23. The electrolyte of claim 16, wherein the polymer is attached, bonded, adhered, or adsorbed to the LPSI.

24. The electrolyte of claim 16, wherein the polymer is bonded to the surface of the LPSI.

25. The electrolyte of claim 16, wherein the polymer is present at about 0.01-50% w/w.

26. The electrolyte of claim 1 formed as a thin film having a film thickness from about 10 nm to about 100 μm.

27. The electrolyte of claim 1 formed as a monolith having an average monolith thickness from about 10 nm to about 100 μm.

28. The electrolyte of claim 26, wherein the film thickness is from about 20 μm to about 60 μm.

29. The electrolyte of claim 26, wherein the film thickness is about 10 μm, 20 μm, 30 μm, 40 μm, 50 μm or 60 μm.

30. The electrolyte of claim 1, comprising LiI.

31. The electrolyte of claim 1, comprising Li$_2$S.

32. The electrolyte of claim 1, having an ionic conductivity of about 1×10$^{-3}$ S/cm or greater.

33. The electrolyte of claim 1, wherein the compound characterized by Li$_x$P$_y$S$_z$I$_t$, wherein 5≤x≤12; 1≤y≤3; 5≤z≤9, and 0.1≤t≤2, has a porosity of less than 20, 15, 10, 5 or 1% as determined by SEM and geometric measurements.

34. The electrolyte of claim 1, wherein the compound characterized by Li$_x$P$_y$S$_z$I$_t$, wherein 5≤x≤12; 1≤y≤3; 5≤z≤9, and 0.1≤t≤2 has a density of at least 80, 85, 90, 95, or 99% as determined by SEM and geometric measurements.

35. The electrolyte of claim 1, wherein the compound is characterized by a XRD reflection at 29° (2Θ) with a full-width at half-maximum (FWHM) of 3°±1°.

36. The electrolyte of claim 1, wherein the compound is of a chemical composition of Li$_{7.4}$P$_{1.6}$S$_{7.2}$I or Li$_{11}$P$_2$S$_6$I.

37. An electrolyte comprising a compound characterized by Li$_x$P$_y$S$_z$I$_t$,
wherein 5≤x≤12; 1≤y≤3; 5≤z≤9, and 0.1≤t≤2; and
characterized by an x-ray powder diffraction (XRD) pattern having a primary peak at 27±1° (2Θ);
and
characterized by an XRD pattern not having at least one of the following reflections 21, 28, 33, 34, and/or 46 (2Θ)
wherein x, y, z, and t are chosen such that the composition is neutrally charged.

38. A film comprising the electrolyte of claim 1.

39. The film of claim 38, having a surface roughness from 0.5 μm Rt to 30 μm Rt, wherein Rt is the maximum surface roughness peak height of sampled surface.

40. The film of claim 38, having a surface roughness from 0.5 μm Ra to 30 μm Ra, wherein Ra is the average peak height of sampled surface roughness.

41. The film of claim 38, having a surface roughness from 1.6 μm Ra to 2.2 μm Ra wherein Ra is the average peak height of sampled surface roughness.

42. The film of claim 38, having a surface roughness from 3.2 μm Ra to 3.7 μm Ra.

43. The film of claim 38, having a surface roughness from 1 μm Rt to 28 μm Rt.

44. A method of making an electrolyte characterized by Li$_x$P$_y$ S$_z$I$_t$,
wherein 5≤x≤12; 1≤y≤3; 5≤z≤9, and 0.1≤t≤2; and
characterized by an x-ray powder diffraction (XRD) pattern having a primary peak at 27±1° (2Θ);
and
characterized by an XRD pattern having at least one of the following reflections at: 20, 25, 29, or 45 (2Θ); wherein the method comprises the following steps:
providing a lithium sulfide compound, providing a phosphorous sulfide compound,
providing a lithium iodide compound,
mixing the lithium sulfide compound, phosphorus sulfide compound, and lithium iodide compound to form a mixture,
milling the mixture to formed a milled mixture; and
heating the mixture from about 100 to about 300° C.

45. An electrochemical device comprising an electrolyte membrane comprising the electrolyte of claim 1.

46. An electrochemical device comprising an electrolyte membrane consisting essentially of the electrolyte of claim 1.

47. The electrolyte of claim 1, wherein the electrolyte is chemically stable when in contact with Li metal.

48. The electrolyte of claim 1, wherein the electrolyte is stable to 1V or lower v. Li metal.

49. The electrolyte of claim 1, wherein the electrolyte is characterized by an XRD powder pattern substantially as shown in FIG. 9.

50. The electrolyte of claim 1, wherein the electrolyte is characterized by a dynamic scanning calorimeter (DSC) thermogram substantially as shown in FIG. 8.

51. The electrolyte of claim 27, wherein the monolith has a second electrolyte on one side of the electrolyte of claim 1 and wherein the second electrolyte is SLOPS having the empirical formula $(1-x)(60:40Li_2S:SiS_2).(x)(Li_3PO_4)$ and wherein x is from 0.01 to 0.99.

52. A film comprising the electrolyte of claim 1 on one side and SLOPS on the other side.

53. A bi-layer solid state electrolyte membrane, having a top and bottom surface, wherein the top surface comprises the electrolyte of claim 1 and wherein the bottom surface comprises SLOPS having the empirical formula $(1-x)(60:40 Li_2S:SiS_2).(x)(Li_3PO_4)$ wherein x is from 0.01 to 0.99.

54. An electrochemical device comprising an electrolyte membrane comprising the bi-layer of claim 53.

55. An electrochemical device comprising:
a first lithium-ion-conducting separator layer comprising at least lithium, sulfur, and phosphorous;
a second lithium-ion-conducting separator layer layered upon the first lithium-ion-conducting separator layer;
wherein the second lithium-ion-conducting separator layer comprises a material selected from the group consisting of SLOPS, a lithium-stuffed garnet, a lithium lanthanum titanium oxide perovskite, an antiperovskite, a LISICON, Thio-LISICON, a lithium conducting phosphate, a lithium aluminum germanium phosphate, and an oxide glass; and
an gel-containing catholyte comprising a polar solvent and a lithium salt;
wherein the second lithium-ion-conducting separator layer is positioned between, and in direct contact with, the first lithium-ion-conducting separator layer and the gel-containing catholyte, and
wherein the second lithium-ion-conducting separator layer is impermeable to the polar solvent of the gel-containing catholyte.

56. An electrochemical device comprising:
a first lithium-ion-conducting separator layer comprising at least lithium, sulfur, a halogen, and phosphorous;
a second lithium-ion-conducting separator layer layered upon the first lithium-ion-conducting separator layer;
wherein the second lithium-ion-conducting separator layer comprises a material selected from the group consisting of SLOPS, a lithium-stuffed garnet, a lithium lanthanum titanium oxide perovskite, an antiperovskite, a LISICON, Thio-LISICON, a lithium conducting phosphate, a lithium aluminum germanium phosphate, and an oxide glass; and
a solid sulfide-containing catholyte;
wherein the second lithium-ion-conducting separator layer is positioned between, and in direct contact with, the first lithium-ion-conducting separator layer and the solid sulfide-containing catholyte; and
wherein the first lithium-ion-conducting separator layer comprises an electrolyte of claim 1.

\* \* \* \* \*